US012598484B2

(12) United States Patent
Ali et al.

(10) Patent No.: US 12,598,484 B2
(45) Date of Patent: Apr. 7, 2026

(54) TRAFFIC AWARE UE TEMPERATURE MANAGEMENT

(71) Applicant: Samsung Electronics Co., Ltd., Suwon-si (KR)

(72) Inventors: Anum Ali, Frisco, TX (US); Vutha Va, Plano, TX (US); Boon Loong Ng, Plano, TX (US); Priyabrata Parida, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 18/490,619

(22) Filed: Oct. 19, 2023

(65) Prior Publication Data

US 2024/0187883 A1 Jun. 6, 2024

Related U.S. Application Data

(60) Provisional application No. 63/430,162, filed on Dec. 5, 2022, provisional application No. 63/429,745, filed on Dec. 2, 2022.

(51) Int. Cl.
H04W 24/02 (2009.01)
H04W 28/02 (2009.01)

(52) U.S. Cl.
CPC ....... H04W 24/02 (2013.01); H04W 28/0215 (2013.01)

(58) Field of Classification Search
None
See application file for complete search history.

(56) References Cited

U.S. PATENT DOCUMENTS

| | | | |
|---|---|---|---|
| 11,063,851 B2 | 7/2021 | Yang et al. | |
| 11,301,012 B2 | 4/2022 | Zhu et al. | |
| 11,558,758 B2 | 1/2023 | Prabhakar et al. | |
| 11,647,425 B2 | 5/2023 | Hong | |
| 11,656,664 B2 | 5/2023 | Cili et al. | |
| 2004/0128663 A1 | 7/2004 | Rotem | |

(Continued)

FOREIGN PATENT DOCUMENTS

| | | |
|---|---|---|
| WO | 2020087321 A1 | 5/2020 |
| WO | 2021179123 A1 | 9/2021 |

(Continued)

OTHER PUBLICATIONS

3GPP TS 36.331 V15.19.0 (Sep. 2022) (Year: 2022).*

(Continued)

*Primary Examiner* — Andre Tacdiran

(57) ABSTRACT

A UE includes a processor configured to detect a type of service currently active at the UE based on a traffic history of the UE, determine UE status and sensor information, and determine a current communication configuration for the UE. The processor is further configured to, based on the service type, the UE status and sensor information, and the current communication configuration, predict a risk of the UE overheating; and based on the predicted risk of the UE overheating, identify a new communication configuration to propose for use by the UE. The UE further includes a transceiver operably coupled to the processor, the transceiver configured to transmit, to a BS, information indicating the new communication configuration.

20 Claims, 16 Drawing Sheets

(56) References Cited

U.S. PATENT DOCUMENTS

| | | | | |
|---|---|---|---|---|
| 2012/0064909 A1* | 3/2012 | Lindoff | | H04W 72/52 |
| | | | | 455/452.2 |
| 2012/0075992 A1 | 3/2012 | Shahidi et al. | | |
| 2015/0350885 A1 | 12/2015 | Stanley-Marbell et al. | | |
| 2016/0065723 A1 | 3/2016 | Jung et al. | | |
| 2018/0224871 A1* | 8/2018 | Sahu | | G06F 1/3231 |
| 2020/0106674 A1* | 4/2020 | Van Der Velde | | H04W 24/10 |
| 2020/0107187 A1* | 4/2020 | Lee | | H04W 8/24 |
| 2020/0174543 A1 | 6/2020 | Hong | | |
| 2021/0051585 A1 | 2/2021 | Kim et al. | | |
| 2021/0232201 A1* | 7/2021 | Chen | | G06F 9/547 |
| 2021/0392716 A1* | 12/2021 | Kim | | H04W 52/0229 |
| 2021/0400588 A1 | 12/2021 | Hong | | |
| 2022/0322335 A1* | 10/2022 | Rugeland | | H04W 52/0235 |
| 2023/0007506 A1 | 1/2023 | van der Velde et al. | | |
| 2023/0180238 A1 | 6/2023 | Wang et al. | | |
| 2024/0129711 A1* | 4/2024 | Kim | | H04W 76/30 |
| 2025/0150873 A1* | 5/2025 | Wallentin | | H04W 24/10 |

FOREIGN PATENT DOCUMENTS

| | | | |
|---|---|---|---|
| WO | WO2021258766 | * | 12/2021 |
| WO | 2022135236 A1 | | 6/2022 |
| WO | 2022229233 A1 | | 11/2022 |

OTHER PUBLICATIONS

Extended European Search Report issued Aug. 4, 2025 regarding Application No. 23898271.4, 11 pages.

Huang et al., "Thermal performance enhancement with DRX in 5G millimeter wave communication system," IEEE Access, vol. 9, 2021, pp. 34692-34707.

International Search Report and Written Opinion issued Feb. 28, 2024 regarding International Application No. PCT/KR2023/019362, 8 pages.

* cited by examiner

1200

1202 — UE sends multiple power saving parameters to the gNB

1222 — gNB configures UE with multiple BWPs (corresponding to power saving parameters) and default BWP

1300

1302 — UE operates with the default BWP

1322 — UE predicts the heat reduction parameters

1332 — UE sends the preferred parameters to the BS

1342 — The BS switches the active BWP for the UE via DCI

TRAFFIC AWARE UE TEMPERATURE MANAGEMENT

CROSS-REFERENCE TO RELATED APPLICATION(S) AND CLAIM OF PRIORITY

This application claims priority under 35 U.S.C. § 119(e) to U.S. Provisional Patent Application No. 63/429,745 filed on Dec. 2, 2022, and to U.S. Provisional Patent Application No. 63/430,162 filed on Dec. 5, 2022. The above-identified provisional patent applications are hereby incorporated by reference in their entirety.

TECHNICAL FIELD

This disclosure relates generally to wireless networks. More specifically, this disclosure relates to traffic aware UE temperature management.

BACKGROUND

The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure provides apparatuses and methods for traffic aware UE temperature management.

In one embodiment, a user equipment (UE) is provided. The UE includes a processor configured to detect a type of service currently active at the UE based on a traffic history of the UE, determine UE status and sensor information, and determine a current communication configuration for the UE. The processor is further configured to, based on the service type, the UE status and sensor information, and the current communication configuration, predict a risk of the UE overheating; and based on the predicted risk of the UE overheating, identify a new communication configuration to propose for use by the UE. The UE further includes a transceiver operably coupled to the processor, the transceiver configured to transmit, to a base station (BS), information indicating the new communication configuration.

In another embodiment, a method of a UE is provided. The method includes detecting a type of service currently active at the UE based on a traffic history of the UE, determining UE status and sensor information, and determining a current communication configuration for the UE. The method further includes, based on the service type, the UE status and sensor information, and the current communication configuration, predicting a risk of the UE overheating; based on the predicted risk of the UE overheating, identifying a new communication configuration to propose for use by the UE; and transmitting, to a BS, information indicating the new communication configuration.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 17, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
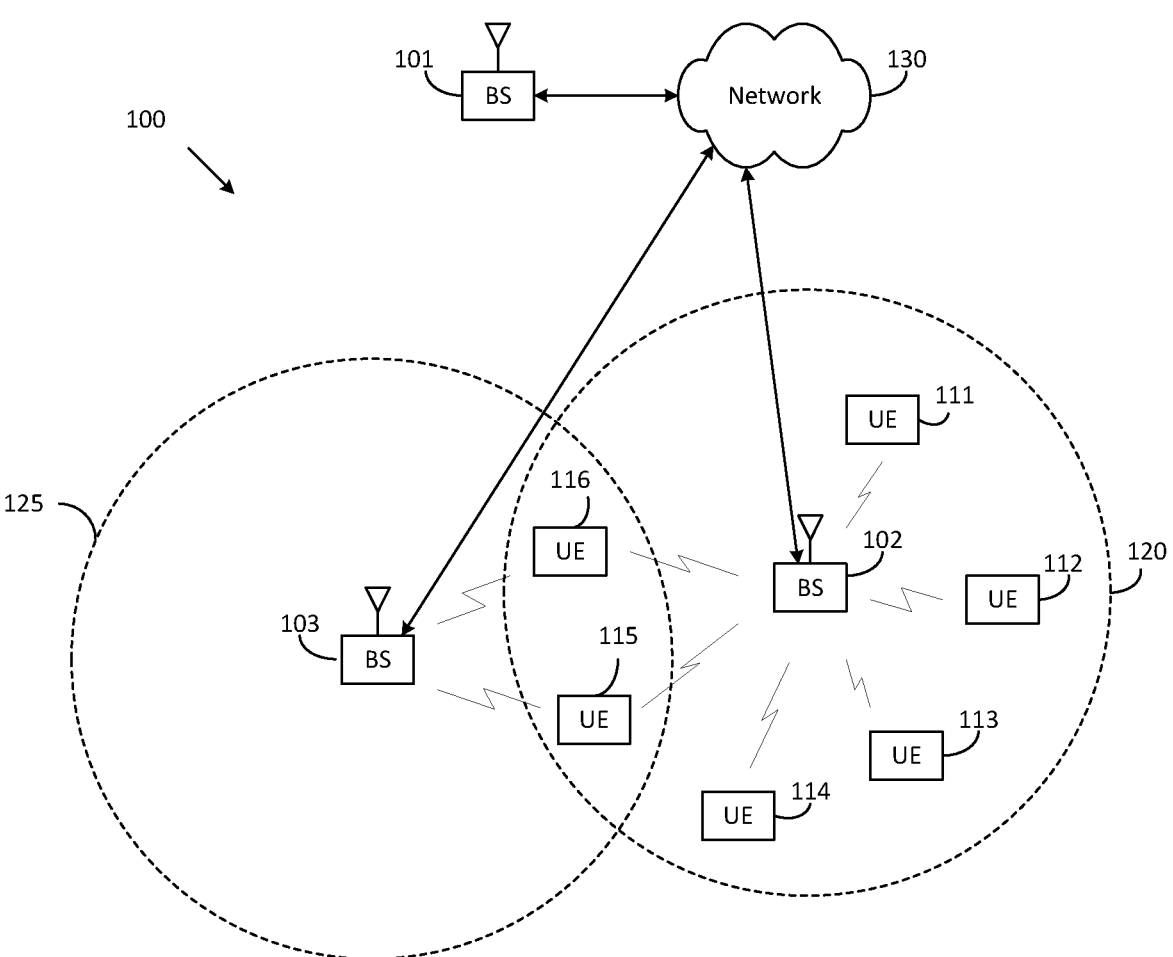
FIG. 1 illustrates an example wireless network according to embodiments of the present disclosure.
Figure 2:
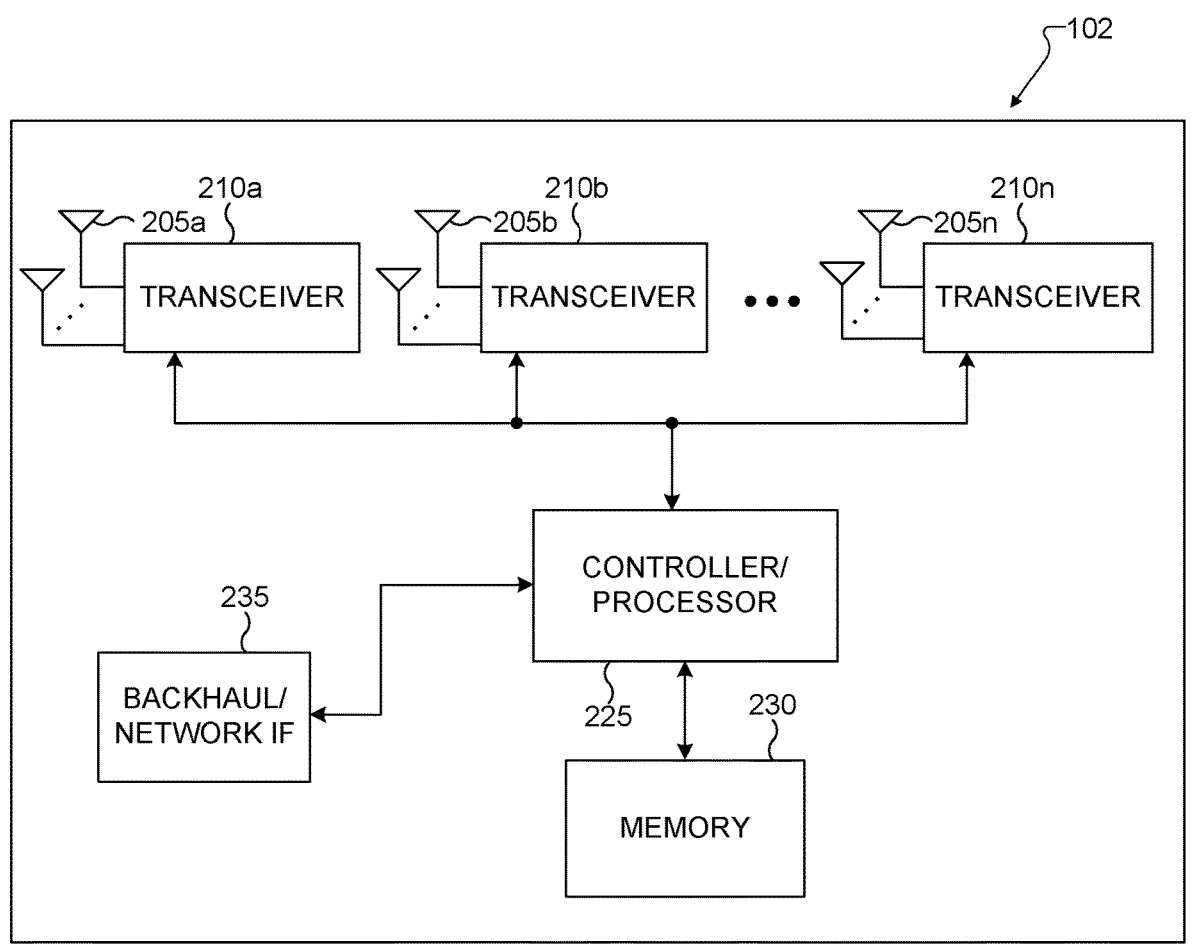
FIG. 2 illustrates example gNB according to embodiments of the present disclosure.
Figure 3:
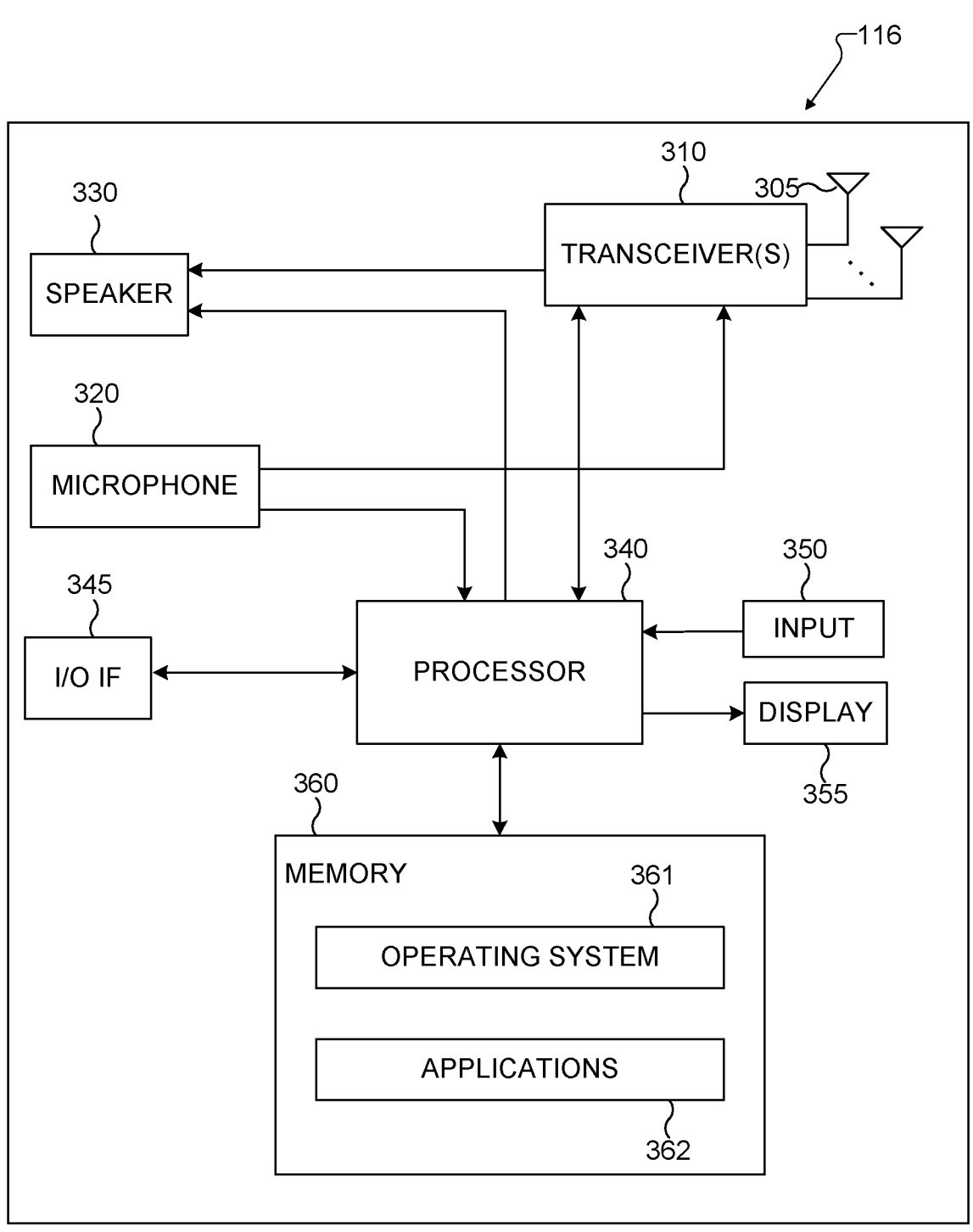
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), WiFi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for traffic aware UE temperature management. In certain embodiments, one or more of the gNBs 101-103 includes circuitry, programing, or a combination thereof, to support traffic aware UE temperature management in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS and, for example, processes to support traffic aware UE temperature management as discussed in greater detail below. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, for example, processes for traffic aware UE temperature management as discussed in greater detail below. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Typically, the network/BS/gNB configures the UE with RF parameters—BW, MIMO layers, component carriers, and DRX parameters—that can enable the UE to support a wide variety of applications. Since at any given time the UE may be using only a handful of these applications, it implies that for a majority of time the UE may be over-configured by the network. This over-configuration not only results in high power consumption at the UE (power consumption coming from keeping components on, e.g., keeping multiple antennas on, and also the processing power consumption, to process signal from a larger bandwidth, multiple antennas, component carriers etc.), but also results in higher device temperatures. The overheating of the device negatively effects the user experience in multiple ways, e.g., discomfort in holding an increasingly hot device, the eventual loss of service since an overheating device will eventually shut down, etc. As such, efficient temperature management of the device during 5G operation is critical.

The UE may be over-configured by the network to enable a wide variety of applications. However, the UE itself knows the current traffic, and as such can propose a configuration to the BS that can help the UE perform temperature management while minimizing the impact on the quality of service (QOS) requirements—in terms of throughput and/or latency—of the current traffic.

Figure 4:
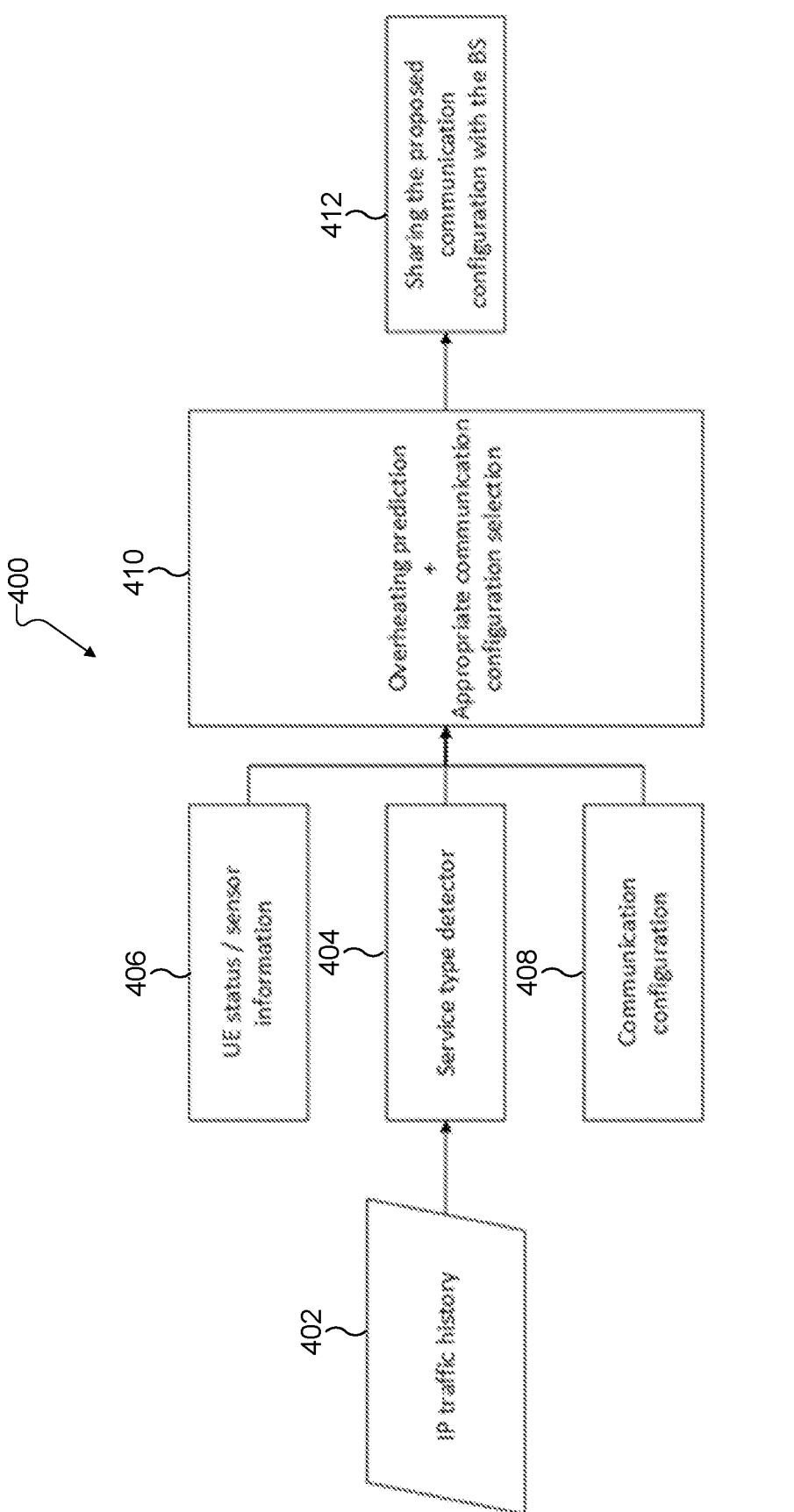
FIG. 4 illustrates a block diagram for an example procedure 400 for traffic aware UE temperature management according to embodiments of the present disclosure.

FIG. 4 illustrates a block diagram for an example procedure 400 for traffic aware UE temperature management according to embodiments of the present disclosure. The embodiment of procedure 400 for traffic aware UE temperature management of FIG. 4 is for illustration only. Different embodiments of a procedure 400 for traffic aware UE temperature management could be used without departing from the scope of this disclosure.

In the example of FIG. 4 the IP traffic history 402 at the terminal is given to the service type detector module 404, which classifies the service type into one of multiple classes (e.g., real-time or non-real time). The UE status or sensor information 406 includes e.g., the device battery level, the screen brightness, device temperature (which could include the temperature of the communication processor, the application processor temperature, the temperature of the device itself, etc.) etc. The communication configuration 408 includes the RF parameters configured by the network for the terminal's use, e.g., the bandwidth, the number of MIMO layers, the number of component carriers etc. The next module is overheating prediction and appropriate parameter selection module 410. Note that this module can also be separated into multiple modules, for example one module for overheating prediction, and another module for parameter selection. This module takes the three inputs (UE status/sensor information 406, service type 404, and communication configuration 408) and determines whether the device is likely to become overheated (within a certain time horizon into the future). Based on the determination, appropriate communication configuration is determined that can avoid overheating while minimizing the impact on the user QoS as much as possible. Subsequently, the proposed communication configuration is transmitted to the BS (which could be based on the UE assistance information feature defined in 3GPP Release 16 or other releases), where the BS could decide to configure the terminal with the requested configuration or not.

The functionality of each block is described in more detail below.

Service type detector (404): The first block is the service type detector which classifies the service types of the currently active applications at the UE. The service type detector takes the IP traffic history 402 as input. The IP traffic history 402 can be a set of features related to the IP traffic flow, including but not limited to the inter-arrival time of the UL and DL packets over a predefined interval T (e.g., 0.5-5 seconds), the size of the UL and DL packets (e.g., maximum/minimum/average size over T), and the number of UL and DL packets over T. The service type detector may classify the service type into coarse classes (e.g., real-time or non-real-time), or further into sub-classes, e.g., audio call, video call, and mobile gaming for the real-time applications and, e.g., browsing, video streaming, or background traffic for the non-real-time applications. ML classifiers like convolutional neural networks (CNNs), or gradient boosting classifiers like extreme gradient boosting (XGBoost) can be used for service type detection. Since different service types pose different requirements on the device, this prediction helps with choosing appropriate device behavior. As an example, if the service is real-time, e.g., an audio call or video call which have regular traffic patterns, the RF circuitry of the UE device may not be turned off even momentarily or there could be a latency increase or event data loss. Whereas, for non-real time applications, where the traffic pattern is irregular with long periods of inactivity, the RF circuitry of the UE device can be turned off to help reduce the device temperature. From above discussion, it can be inferred that the device is likely to heat up more quickly while the service type is real-time in comparison to non-real-time service type. Besides the consideration on the required data traffic patterns, different types of applications may use other device resources differently that could contribute differently to the temperature of the device, e.g., for online mobile gaming applications, the requirement on the rendering of the video and the local load on the processor could be high. High display requirements could lead to a relatively high device temperature as a baseline. In that case, the communication chip could be more prone to overheating than other applications that may not use other device resources as much. Following this observation, categorization of the service types maybe based on the applications required local resource usage that could affect the baseline temperature of the device. The prediction of the service detector—implemented at the UE—should be accessible to the application processor (AP) where the proposed overheating prediction plus appropriate communication configuration selection module is likely to be implemented.

UE status and sensor information (406): The device temperature is impacted by several UE behaviors that can be inferred by the UE status and sensor information 406. As an example, the screen brightness and the screen on time may correlate positively with the device temperature. The activity level of the mobile device CPU/GPU could also correlate positively with the device temperature. The trend of the device temperature is also a useful predictor of the device's future temperature, e.g., increasing temperature in the recent past may indicate further temperature rise unless some corrective action is performed, and vice versa. Ambient temperature of the environment is another piece of information that may positively correlate with the likelihood for overheating. All the aforementioned pieces of information—and others if suitable—are grouped under the umbrella term UE status and sensor information. The output from various sensors at the UE should be accessible to the application processor (AP) where the proposed overheating prediction plus appropriate communication configuration selection module is likely to be implemented.

Communication configuration (408): The communication related power consumption and processing comes from both RF operations and baseband operations. The power consumption and processing positively correlate with device temperature. So, the UE communication configuration 408 impacts the device temperature. Specifically, the parameters that could impact the device temperature are the communication bandwidth (larger bandwidth resulting in higher temperatures through more processing), the maximum number of MIMO layers (a larger number of MIMO layers implies more processing in the UL/DL and possibly higher total transmission power in the UL and a larger number of active antennas/RF chains, which could lead to higher temperatures), the number of component carriers (a larger number of component carriers implies more processing and thus higher power consumption, e.g., due to tracking of reference signals for each component carrier, resulting in higher temperatures) etc. All of the aforementioned pieces of information—and others if suitable—are collectively called communication configuration. The communication configuration should be accessible to the application processor (AP) where the proposed overheating prediction plus appropriate communication configuration selection module is likely to be implemented.

Overheating prediction and appropriate parameter selection to avoid overheating (410): This module takes the input from UE status/sensor information 406, service type detector 404, and communication configuration 408 to make a prediction whether the device is prone to overheating. Several embodiments in this disclosure deal with the design of this module and are discussed in detail later. Depending on the decision whether the device is prone to overheating or not, an appropriate communication configuration is selected, which the device deems suitable for temperature management.

Sharing the proposed communication configuration with the BS (412): The UE shares the proposed communication configuration with the BS, which then decides whether to configure the UE with the proposed communication configuration or not. If the UE is configured with the proposed parameters, then the UE starts operation with the new communication configuration, otherwise the UE will continue the operation with the previously configured communication configuration. Since the BS behavior is outside the UE's control, in subsequent embodiments we will focus on the cases when the BS respects the UE's proposal and configures the UE with requested parameters. Multiple embodiments in this disclosure deal with efficient mechanisms for the BS to configure the UE with its proposed configuration parameters.

Although FIG. 4 illustrates an example of a procedure 400 for traffic aware UE temperature management, various changes may be made to FIG. 4. For example, various components in FIG. 4 could be combined, further subdivided, or omitted and additional components could be added according to particular needs.

Figure 5:
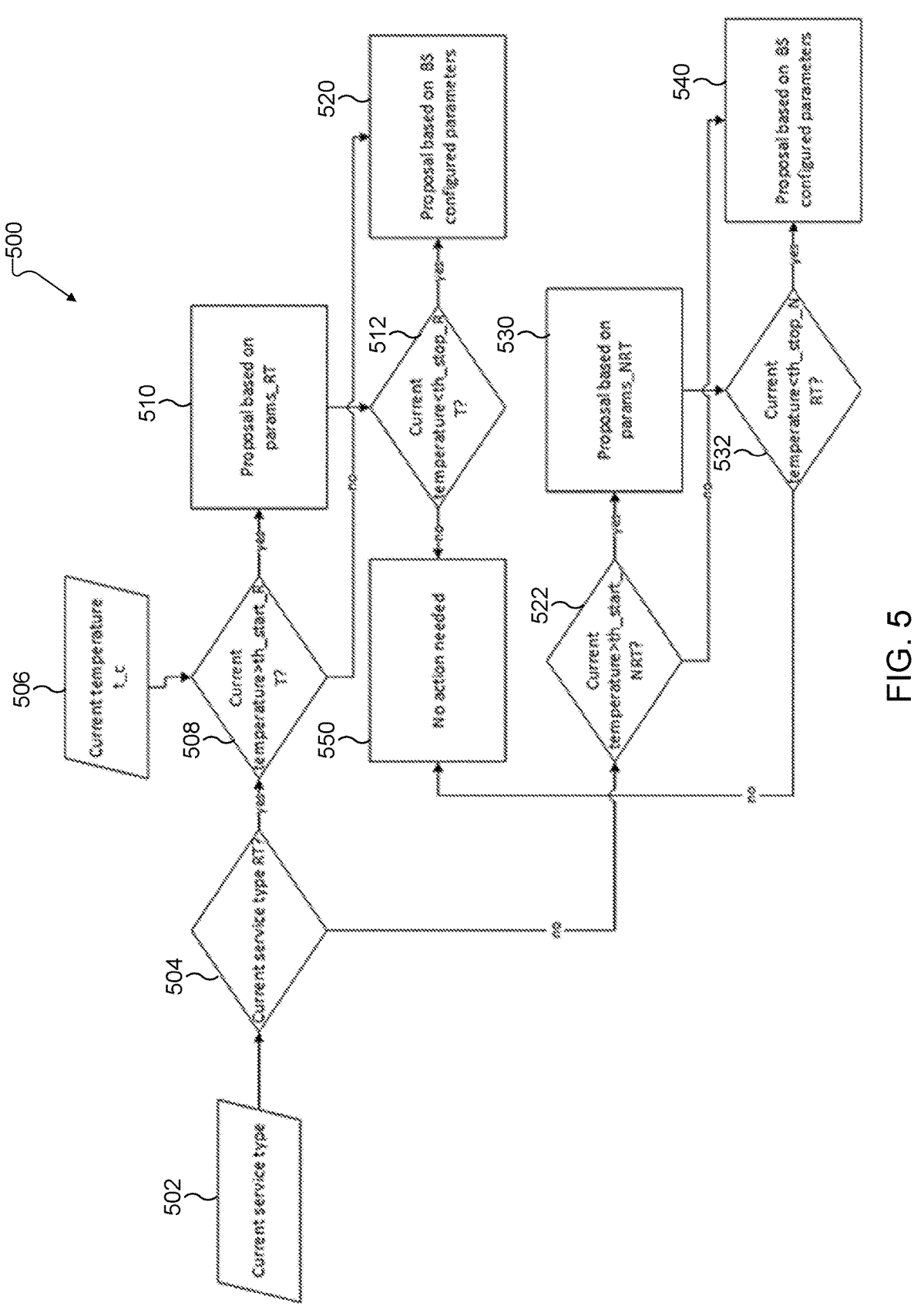
FIG. 5 illustrates a method for prediction and selection based on current temperature according to embodiments of the present disclosure.

In one embodiment, module 410 of FIG. 4 may be implemented similar as described regarding FIG. 5.

FIG. 5 illustrates a method 500 for prediction and selection based on current temperature according to embodiments of the present disclosure. An embodiment of the method illustrated in FIG. 5 is for illustration only. One or more of the components illustrated in FIG. 5 may be implemented in specialized circuitry configured to perform the noted functions or one or more of the components may be implemented by one or more processors executing instructions to perform the noted functions. Other embodiments of prediction and selection based on current temperature could be used without departing from the scope of this disclosure.

FIG. 5 illustrates a prediction and selection solution based on current temperature. In the example of FIG. 5, it is assumed that the service type detector (e.g., service type detector 404 of FIG. 4) classifies the current service type into two categories, i.e., real-time and non-real-time applications.

In the example of FIG. 5, different configurations are applied based on operational temperature ranges. For example, the communication configuration suitable for real-time (RT) applications is applied (block 510) when the service type (block 502) is RT (block 504) and temperature t_c (block 506) is larger than start threshold th_start_RT (block 508) and the configuration reverts to NW default configuration (block 520) when the temperature is less than stop threshold th_stop_RT (block 512). In addition, the communication configuration suitable for non-real-time (NRT) is applied (block 530) when the service type is NRT (block 504) and temperature t_c is larger than start threshold th_start_NRT (block 522) and the configuration reverts to NW default configuration (block 540) when the temperature is less than stop threshold th_stop_NRT (block 532). If the temperature t_c remains below th_stop_RT for RT service (block 512) and below th_stop_NRT for the NRT service (block 522), the device can keep on operating with the communication configuration that is configured by the network (block 550).

To understand the procedure, let us consider an example in which the device is operational, and the current service type is RT. With continuous operation the device temperature may start to rise, until it may reach a point th_start_RT. At this stage, if no action is taken, the device is prone to overheating in the future if RT service continues. As such the device proposes a communication configuration suitable for RT applications to the BS. If the BS grants the device the proposed communication configuration, the device may start to cool down, until it reaches a point th_stop_RT, where the device has cooled down enough that the operation with communication configuration that the BS initially chose can resume. The same idea applies to the NRT service types. For the case of mixed service type, when the UE is using a RT as well as an NRT application, the application category with conservative requirements should be used for parameter selection. Typically, the latency requirements are tighter for RT applications and as such if the service type is both RT and NRT (for mixed traffic), temperature management should be based on RT applications.

When the device resumes operation with BS configured parameters, the device may start to heat up again. In another implementation, once the device has cooled down to the point th_stop_RT, the device does not request the communication configuration (e.g., using the UE Assistance Information feature) that the BS initially chose. Instead, the device requests a communication configuration that is lower than the communication configuration originally set by the BS (BS configured parameters), but higher than the communication application chosen for temperature reduction (params_RT). Here the term "lower" and "higher" respectively imply the communication configuration that can result in "slower" temperature rise in a given time period and the communication configuration that can result in a "faster" temperature rise in a given time period. This communication configuration can be called an intermediate communication configuration. The benefit of operation with an intermediate communication configuration instead of BS configured parameters is that the device is less likely to start heating up again immediately. In another implementation once the configuration is switched to the implementation based on params_RT, it does not revert back to the BS configured parameters. This is because the temperature of the device is not likely to fall below a certain point (e.g., the ambient temperature) and the device can successfully operate with params_RT while maintaining QoS service. This helps in saving the RRC reconfiguration overhead associated with switching back to the BS configured parameters, and also minimizes the risk of reheating after the device has cooled down. Note that while for simplicity of explanation, terms such as 'switching the configuration' were used, but this should be understood as the UE may follow the typical standards-specified procedures, e.g., the UE may first request the new configuration, which may or may not be granted to the UE. Especially, a request to use a higher configuration after the cooling down (which typically requires more resources) may or may not be granted by the BS depending on its current load. When a request to use a higher configuration is rejected, the UE may wait for some timeout or prohibit timer period and try again. This rejection of the high configuration has no negative impact on the temperature control.

Appropriate thresholds could be determined by experiments. Specifically, experiments could be conducted to observe the device temperature variation with different service types and different communication configuration to determine the appropriate thresholds for different service types. As an example, since RT applications require the device to transmit and receive continuously, th_start_RT may be less than th_start_NRT, and th_stop_RT may be less than th_stop_RT.

With a 45° C. threshold for overheating, an example value for [th_start_RT, th_stop_RT] can be [35,30] and example value for [th_start_NRT, th_stop_RT] can be [38,34].

Although FIG. 5 illustrates one example of a method 500 for prediction and selection based on current temperature, various changes may be made to FIG. 5. For example, while shown as a series of steps, various steps in FIG. 5 could overlap, occur in parallel, occur in a different order, or occur any number of times.

FIG. 5 above is based on the current temperature. The overheating prediction, however, can be made more accurately if the temperature itself can be accurately forecasted or predicted.

Figure 6:
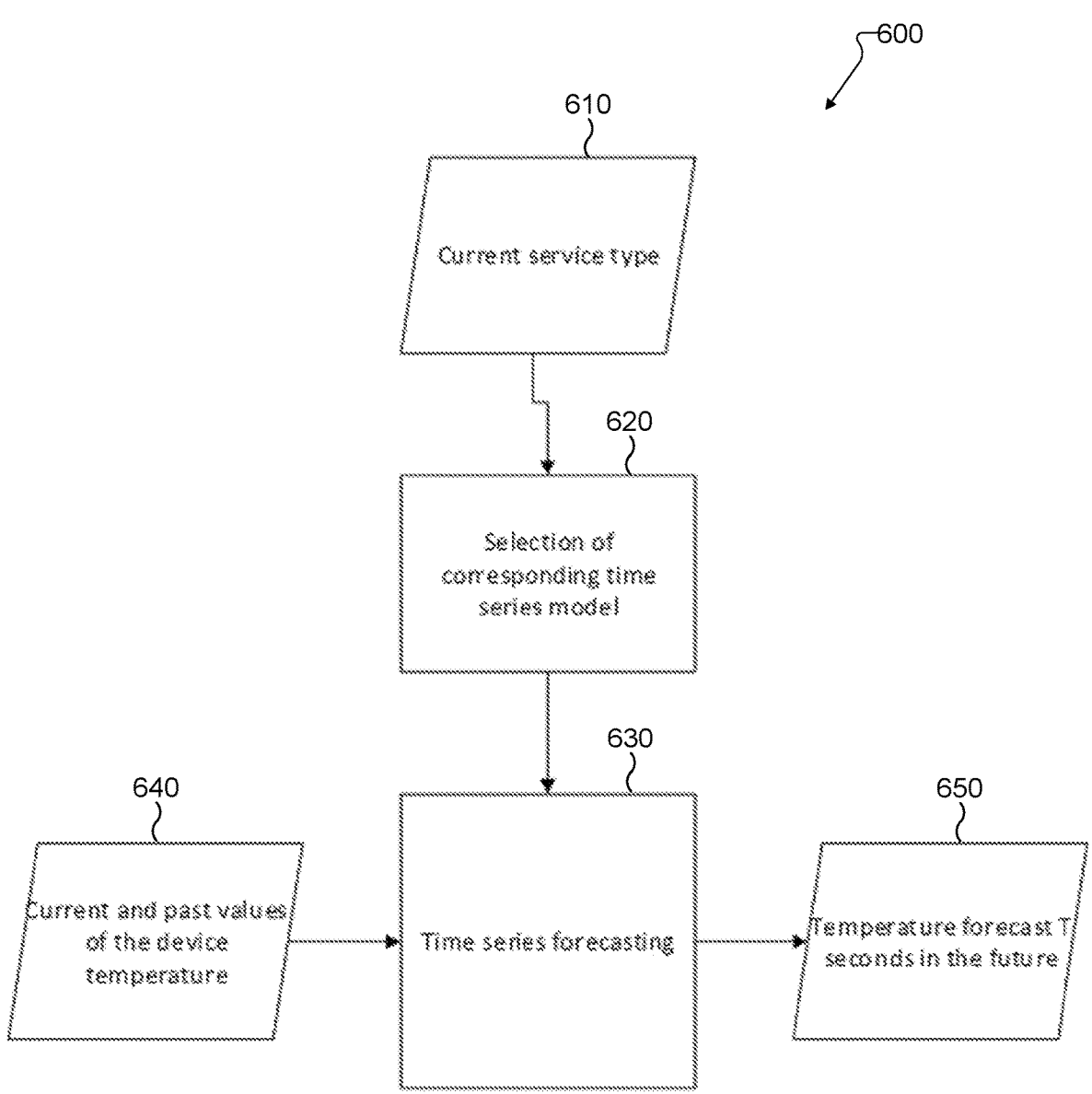
FIG. 6 illustrates a method for prediction of a future temperature according to embodiments of the present disclosure.

FIG. 6 illustrates a method 600 for prediction of a future temperature according to embodiments of the present disclosure. An embodiment of the method illustrated in FIG. 6 is for illustration only. One or more of the components illustrated in FIG. 6 may be implemented in specialized circuitry configured to perform the noted functions or one or more of the components may be implemented by one or more processors executing instructions to perform the noted functions. Other embodiments of prediction and selection based on current temperature could be used without departing from the scope of this disclosure.

One method of temperature forecasting is to consider the past and present temperatures as a time series and predict the future temperatures based on time series forecasting as illustrated in FIG. 6. As illustrated in FIG. 6, the method 600 begins at step 610. First, based on the output of the current service type at step 610, the corresponding time series model is selected at step 620. As an example, if the service type is either RT or NRT, the time series model corresponding to RT or NRT is selected. Separate time series models are fit to the RT data or NRT data in an offline phase. Auto-regressive (AR), moving average (MA), auto-regressive moving average (ARMA), auto-regressive integrated moving-average (ARIMA) etc. can be used, depending on the exact characteristics of the observed time series data. As an example, if the data is stationary in the sense of mean ARMA could be used, whereas if the data is non-stationary in the sense of mean ARIMA could be used. Solutions based on machine learning techniques such as RNN, LSTM, GRU, 1D CNN, etc., may also be used. At step 630, during the online operation, the time series model corresponding to the currently detected service type is chosen, the past and present values of the device temperature are fed to the model at step 640, and at step 650 the model predicts a future temperature value, e.g., T seconds in the future (example values of T are 1, 2 and 5 seconds). It can be imagined that accurate prediction over a larger time horizon is more useful for the UE temperature management, but such a predication may be more difficult to achieve.

Although FIG. 6 illustrates one example of a method 600 for prediction of a future temperature, various changes may be made to FIG. 6. For example, while shown as a series of steps, various steps in FIG. 6 could overlap, occur in parallel, occur in a different order, or occur any number of times.

In an alternative embodiment, various other inputs—in addition to the temperature time series—are given to the model for accurate prediction over a longer time horizon. An example of this strategy is illustrated in FIG. 7.

Figure 7:
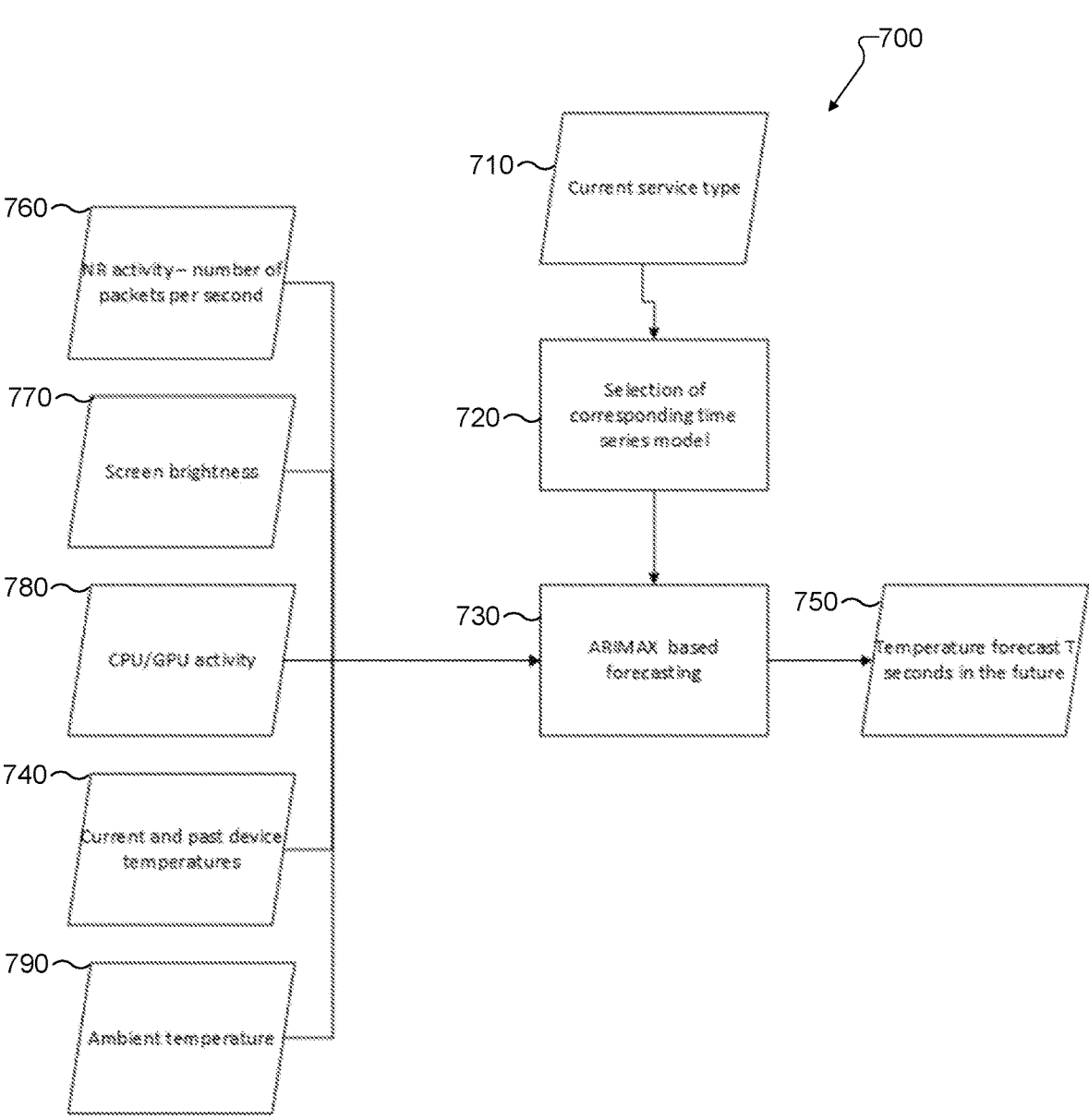
FIG. 7 illustrates a method for prediction of a future temperature according to embodiments of the present disclosure.

FIG. 7 illustrates a method 700 for prediction of a future temperature according to embodiments of the present disclosure. An embodiment of the method illustrated in FIG. 7 is for illustration only. One or more of the components illustrated in FIG. 7 may be implemented in specialized circuitry configured to perform the noted functions or one or more of the components may be implemented by one or more processors executing instructions to perform the noted functions. Other embodiments of prediction and selection based on current temperature could be used without departing from the scope of this disclosure.

In the example of FIG. 7, the current service type 720 is used for selection of a corresponding time series model at step 720. The time series model, however, is more complex than the example of FIG. 6. The time series forecasting is not only based on the current and past temperatures 740, but also on several explanatory or exogenous variables 760-790. These variables are not exactly temperatures but several other factors that impact the temperature indirectly. At step 730, the right auto-regressive integrated moving-average with exogenous variables (ARIMAX), or its seasonal counterpart seasonal ARIMAX (SARIMAX) can be used for this purpose depending on whether the variables are seasonal or not. The exogenous variables include NR activity 760, i.e., the number of PHY layers packet per second over the last few seconds, the history of screen brightness 770, the CPU/GPU activity 780, and the ambient temperature 790. An example of seasonal exogenous variable is the ambient temperature which may show seasonality over the duration of 24 hours with rise during the day and fall during the night. Since all these factors impact the temperature, taking all these variables into account can enable more accurate predictions over possibly a longer horizon. The relative difference between the example of FIG. 6 and the example of FIG. 7 is that of complexity and accuracy. The method of FIG. 6 is likely to be less accurate over a longer horizon than the method of FIG. 7, but the method of FIG. 6 has a lower complexity of offline training as well as the online exploitation phase. In another implementation, in order to reduce the complexity, the temperature forecasting module is activated only if the current temperature is above a threshold (e.g., 35° C.). In yet another, implementation, the temperature forecasting module is activated if the change of temperature over a time window (5-10 sec) has been above a threshold (e.g., 1 degree over 5 seconds).

In another implementation, to leverage the various UE contextual information (which includes the UE status, various sensor's information, and NR configurations status) along with the service type, a binary prediction classifier may be trained, where the two classes are 'high overheating risk' and 'no overheating risk' to occur within a certain prediction horizon. In one solution, at a high level, the baseline power consumption of the device excluding that of the NR module along with power consumption of the NR module is used. As an example, to provide the baseline power consumption, major power consumption modules are used, e.g., the screen brightness, the current device temperature, the processing requirements (which could be related to the application type). For the NR module power consumption estimation (and thus the potential increase in temperature), the channel quality metric, uplink utilization rate, and UE configurations such as bandwidth, number of MIMO layers, etc. are used.

Although FIG. 7 illustrates one example of a method 700 for prediction of a future temperature, various changes may be made to FIG. 7. For example, while shown as a series of steps, various steps in FIG. 7 could overlap, occur in parallel, occur in a different order, or occur any number of times.

Based on the methods of FIG. 6 and FIG. 7, future temperatures can be predicted. That future temperature prediction can be used for device temperature management as shown in FIG. 8.

Figure 8:
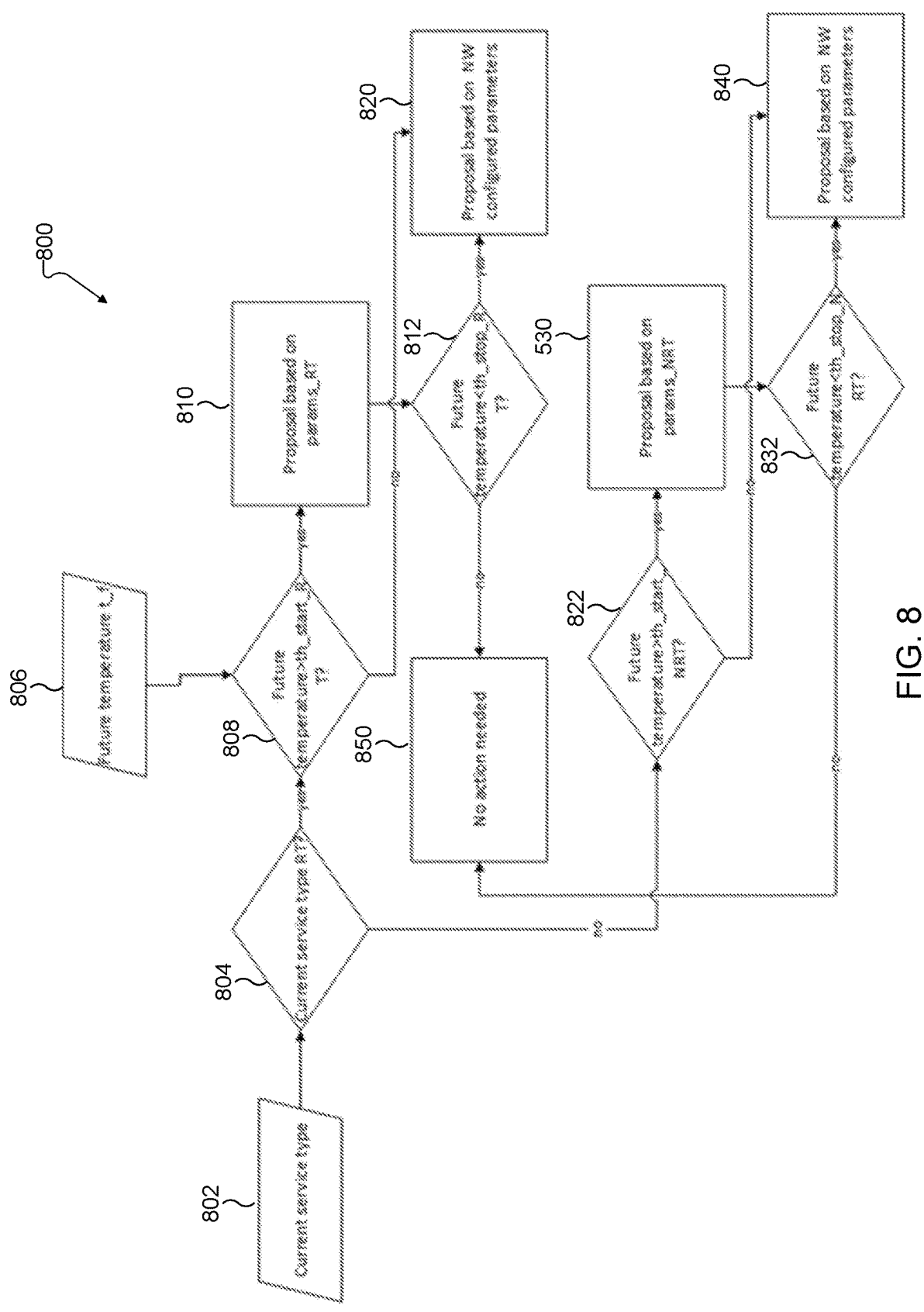
FIG. 8 illustrates a method for prediction and selection based on a predicted future temperature according to embodiments of the present disclosure.

FIG. 8 illustrates a method 800 for prediction and selection based on a predicted future temperature according to embodiments of the present disclosure. An embodiment of the method illustrated in FIG. 8 is for illustration only. One or more of the components illustrated in FIG. 8 may be implemented in specialized circuitry configured to perform the noted functions or one or more of the components may be implemented by one or more processors executing instructions to perform the noted functions. Other embodiments of prediction and selection based on predicted future temperature could be used without departing from the scope of this disclosure.

In the example of FIG. 8, the temperature thresholds defined for the example of FIG. 5 are compared with the future prediction of the temperature instead of the current temperature.

In the example of FIG. 8, different configurations are applied based on operational temperature ranges. For example, the communication configuration suitable for real-time (RT) applications is applied (block 810) when the service type (block 802) is RT (block 804) and future temperature t_f (block 806) is larger than th_start_RT (block 808) and the configuration reverts to NW default configuration (block 820) when the future temperature is less than th_stop_RT (block 812). In addition, the communication configuration suitable for non-real-time (NRT) is applied (block 850) when the service type is NRT (block 804) and future temperature t_f is larger than th_start_NRT (block 822) and the configuration reverts to NW default configuration (block 840) when the future temperature is less than th_stop_NRT (block 832). If the future temperature t_f remains below th_stop_RT for RT service (block 812) and below th_stop_NRT for the NRT service (block 822), the device can keep on operating with the communication configuration that is configured by the network (block 850).

The benefit of the method of FIG. 8 based on the future temperature prediction compared to the method of FIG. 5 is that due to the temperature prediction, the risk of overheating can be determined well in advance of the actual overheating event. Because of this, the parameters that are proposed for the RT/NRT application do not need to be as conservative as in the case of the example of FIG. 5 where the risk of device overheating is more imminent. Here conservative parameters imply the parameters that are likely to result in less temperature rise or to cool down the device quicker, e.g., lower BW and smaller number of antennas. So less conservative parameters will cool down the device slowly, whereas more conservative parameters will cool down the device more quickly. Due to this advantage, the device can operate with less conservative RT/NRT parameter choices for longer periods of time implying better QoS for the user compared to the case when the device needs to operate with more conservative parameters for shorter duration of time. In other words, less rapid transitions in the QoS are more favorable to user experience. The trade-off of the method of FIG. 8 is the added computational complexity of the temperature prediction. Further, since the temperature forecast is an estimation/prediction problem, prediction is inherently prone to errors. While the example of FIG. 8 uses the current service type, alternatively based on the history of the service type detection, some service type forecast could also be used.

Similar to alternative implementations of the method of FIG. 5, alternative implementations for future temperature-based predictions are defined. Specifically, in another implementation, once the device has cooled down to the point th_stop_RT, the device does not resume operation with the communication configuration that the BS initially chose. Instead, the device starts operation with a communication configuration that is lower than the communication configuration originally set by the BS (BS configured parameters), but higher than the communication application chosen for temperature reduction (params_RT). This communication configuration can be called an intermediate communication configuration. The benefit of operation with an intermediate communication configuration instead of BS configured parameters is that the device does not start heating up again immediately. In another implementation once the configuration is switched to the one based on params_RT, it does not revert back to the BS configured parameters. This is because the temperature of the device is not likely to fall below a certain point (e.g., the ambient temperature) and the device can successfully operate with params_RT while maintaining QoS service. This helps in saving the RRC reconfiguration overhead associated with switching back to the BS configured parameters, and also minimizes the risk of reheating after the device has cooled down.

Although FIG. 8 illustrates one example of a method 800 for prediction and selection based on a predicted future temperature, various changes may be made to FIG. 8. For example, while shown as a series of steps, various steps in FIG. 8 could overlap, occur in parallel, occur in a different order, or occur any number of times.

Figure 9:
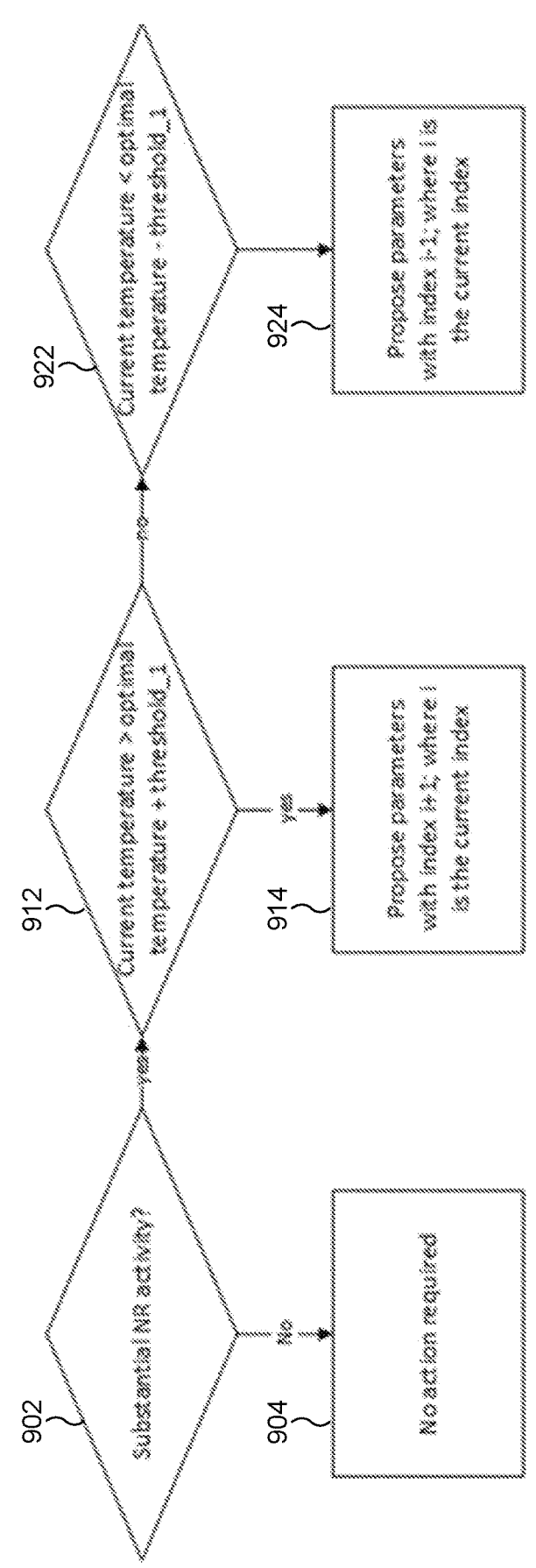
FIG. 9 illustrates a method for prediction and selection based on a desired temperature according to embodiments of the present disclosure.

The solutions described so far, i.e., the examples of FIG. 5 and FIG. 8, change the parameters based on the risk of overheating in which the UE determines the best configuration offline, and during the online operation applies the configuration until either the current temperature or a future forecast of the temperature falls below a certain predefined threshold. An alternative is shown in FIG. 9, in which the device tries to maintain temperature close the desired temperature (which could be ambient temperature). The desired temperature may also be referred to as a target temperature, an optimal temperature, etc.

FIG. 9 illustrates a method 900 for prediction and selection based on a desired temperature according to embodiments of the present disclosure. An embodiment of the method illustrated in FIG. 9 is for illustration only. One or more of the components illustrated in FIG. 9 may be implemented in specialized circuitry configured to perform the noted functions or one or more of the components may be implemented by one or more processors executing instructions to perform the noted functions. Other embodiments of prediction and selection based on predicted future temperature could be used without departing from the scope of this disclosure.

In the example of FIG. 9, the method begins at block 902 by first checking if there is substantial new radio (NR) activity occurring. If there is no NR activity, then the NR operation has no bearing on the device temperature and parameter selection is not required. In contrast, if there is substantial NR activity occurring, then the parameters to be proposed are selected from parameters from a table. The index of the parameters is the row index of the table. The table is populated such that the operation with parameters at row i is likely to create more heat than the parameters at row i+1. This table can be populated offline by configuring the UE with different parameters and noting down the impact on temperature. During the online operation, at block 912 if there is substantial NR activity occurring, then if the current temperature higher than the desired temperature (e.g., 30° C.) by threshold_1 (e.g., 5° C.), and the device is operating with current parameter at index i, then at block 914 the device will propose parameters at index i+1. The time interval between two consecutive recommendations is at least equal to the SR prohibit timer configured by the network in the UE assistance framework. In addition, at block 922 if the current temperature is less than the desired temperature by a threshold threshold_2 (which could be equal to threshold_1, e.g., 5° C.), and the device is operating with parameters at index i, then at block 924 the device may propose parameters at index i−1. This way, with consistently changing the parameters with temperature variations, and observing the impact of these choices on the device temperature, the device can remain fairly close to a desired temperature for longer periods of time. The trade-off of this strategy compared to the open loop solution is possibly higher RRC configuration load as the device keeps on refining the parameters it is operating within.

Since the objective is to maintain some QoS, in another implementation the index i is not always reduced whenever current temperature is less than ambient temperature by threshold_1. Instead, it is checked whether the current parameter set can meet the QoS requirement. This can be done based on the service type detector and depending on the service type (real time or non-real-time) and the current index i, the index i can be reduced or maintained as is. In another implementation, the temperature change is monitored instead of absolute change, i.e., if the temperature change over a specific time window (5 seconds) is larger than a threshold, then the parameters with a larger index i are used and vice versa. In another implementation, if the binary prediction classifier indicates 'high overheating risk', then parameters with index i+1 can be used. On the other hand, if the classifier indicates 'low overheating risk', then depending on whether the QoS for the current service type is met or not, the parameters with index i−1 or i maybe used.

Although FIG. 9 illustrates one example of a method 900 for prediction and selection based on a desired temperature, various changes may be made to FIG. 9. For example, while shown as a series of steps, various steps in FIG. 9 could overlap, occur in parallel, occur in a different order, or occur any number of times.

After the UE determines the communication configuration, the configuration determined by the UE is conveyed to the BS.

Figure 10:
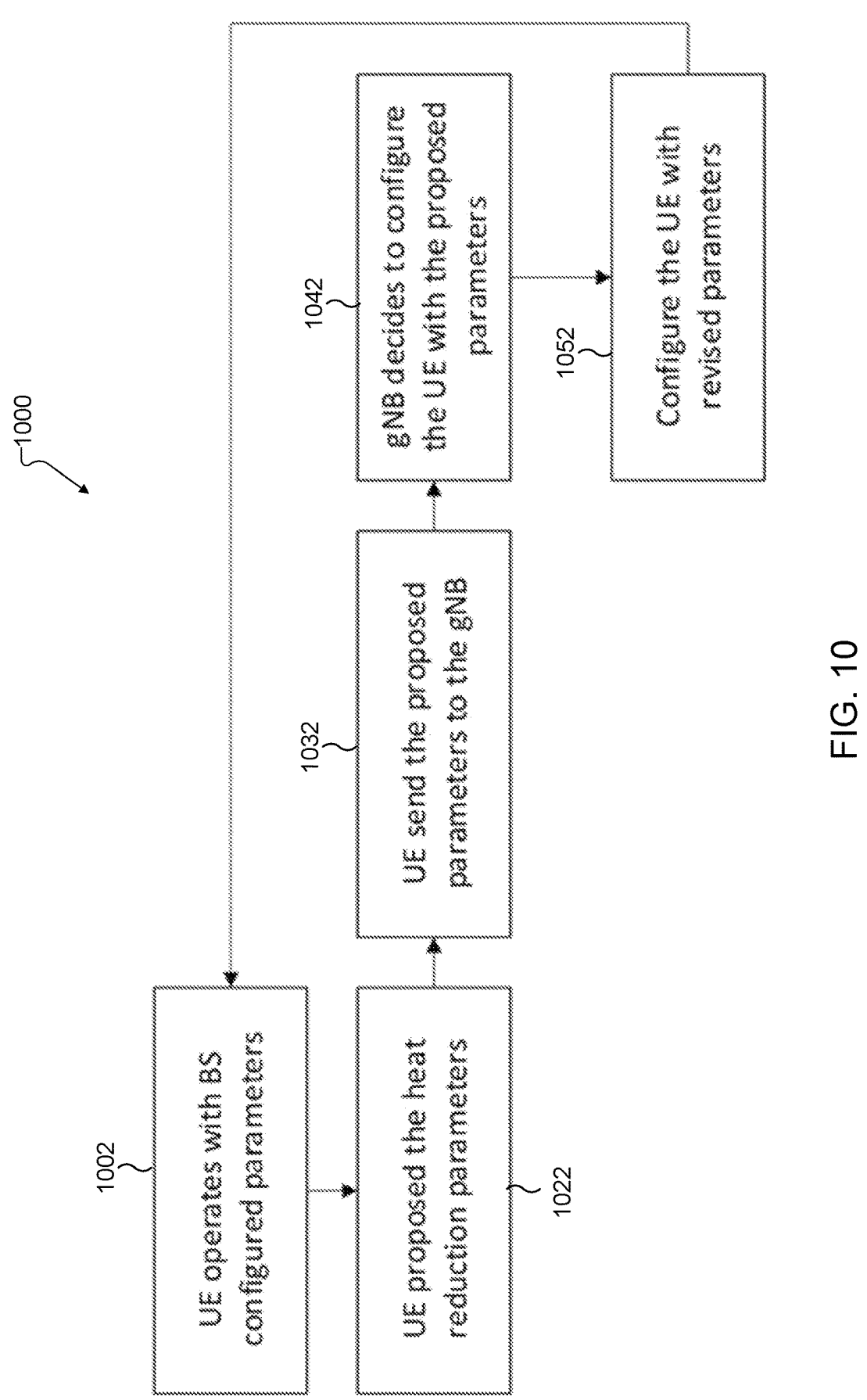
FIG. 10 illustrates a method for conveying a communication configuration to a BS according to embodiments of the present disclosure.

FIG. 10 illustrates a method 1000 for conveying a communication configuration to a BS according to embodiments of the present disclosure. An embodiment of the method illustrated in FIG. 10 is for illustration only. One or more of the components illustrated in FIG. 10 may be implemented in specialized circuitry configured to perform the noted functions or one or more of the components may be implemented by one or more processors executing instructions to perform the noted functions. Other embodiments of conveying a communication configuration to a BS could be used without departing from the scope of this disclosure.

As illustrated in FIG. 10, the method 1000 begins at step 1002. At step 1002, a UE operates with BS configured parameters. At step 1022, the UE determines proposed heat reduction parameters. At step 1032, the UE sends the proposed heat reduction parameters to the BS. At step 1042, the BS decides whether to configure the UE with the proposed parameters. At step 1052, the BS configures UE with revised parameters. Finally, At step 1002, the UE operates with the revised BS configured parameters.

In the example of FIG. 10 the BS configures the UE with proposed configuration depending on the UE proposal. There are, however, multiple compromises made with this method. First, whether the BS will configure the UE with requested/proposed configuration is up to BS discretion. This is true even though the UE is likely to request to only reduce the resources already configured by the BS. Second, the reconfiguration of the UE is through RRC reconfiguration, which poses large overhead (i.e., worst case overhead of 45 KB). This is why it is desirable to avoid frequent RRC reconfiguration. Further, even if frequent RRC configuration can be afforded it will result in further activity at the UE side which may result in exacerbating the overheating issue.

Although FIG. 10 illustrates one example of a method 1000 for conveying a communication configuration to a BS, various changes may be made to FIG. 10. For example, while shown as a series of steps, various steps in FIG. 10 could overlap, occur in parallel, occur in a different order, or occur any number of times.

Figure 11:
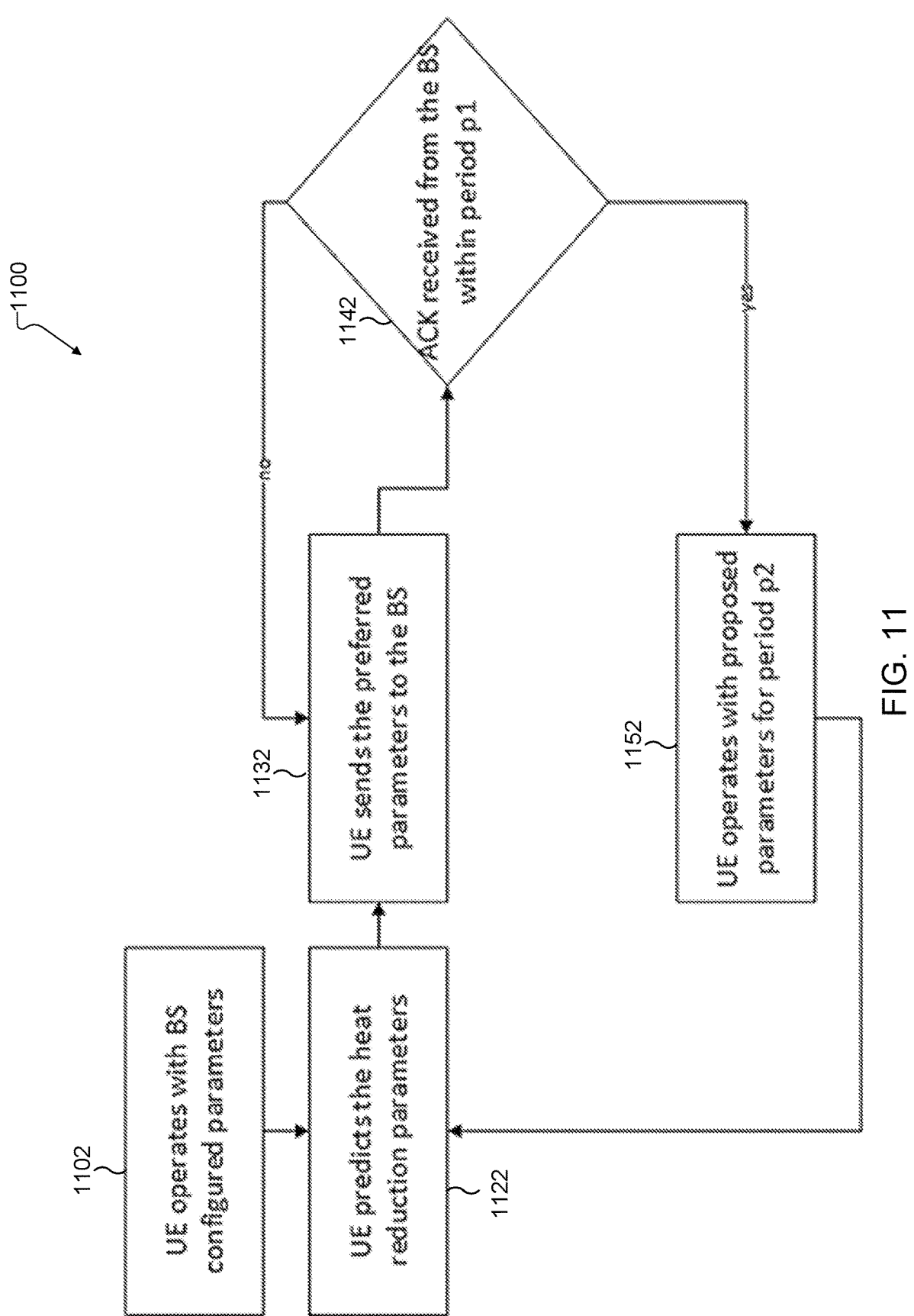
FIG. 11 illustrates a method for conveying a communication configuration to a BS according to embodiments of the present disclosure.

An alternative implementation is shown in FIG. 11, in which the BS just needs to acknowledge the UE choice.

FIG. 11 illustrates a method 1100 for conveying a communication configuration to a BS according to embodiments of the present disclosure. An embodiment of the method illustrated in FIG. 11 is for illustration only. One or more of the components illustrated in FIG. 11 may be implemented in specialized circuitry configured to perform the noted functions or one or more of the components may be implemented by one or more processors executing instructions to perform the noted functions. Other embodiments of conveying a communication configuration to a BS could be used without departing from the scope of this disclosure.

It is conceivable that the BS can always grant the UE choice since in the temperature management context, the UE will not request parameters (BW, layers, maximum number of MIMO layers, and DRX parameters) that are higher than what is initially configured by the BS. As such granting UE request does not pose any problem from resource limitation point of view. Always granting UE's request, however, may complicate the implementation of the BS scheduler. In that light, this implementation can be seen as trading off the communication overhead for the BS (to send the RRC reconfiguration to the UE) with implementation overhead (a more complicated scheduler).

As illustrated in FIG. 11, the method 1100 begins at step 1102. At step 1102, a UE operates with BS configured parameters. At step 1122, the UE determines proposed heat reduction parameters. At step 1032, the UE sends the proposed heat reduction parameters to the BS. The UE sends its preferred parameters with the BS. Even though the BS is expected to grant the UE choice, the UE needs to wait for the acknowledgement from the BS. This is because the request may not get correctly decoded at the BS. At step 1142, if there is no acknowledgement within a specific time period p1 (e.g., a predetermined period), the UE may resend the preferred parameters to the BS at step 1132. The period p1 represents the delay in transmission and BS decoding the message as in the order of few ms. At step 1142, if the UE receives acknowledgement from the BS, the UE continues the operation with the proposed parameters for a period p2, after which the UE determines the preferred parameters again at step 1122. The period p2 is the prohibit timer in the UE assistance framework, since it prevents the UE from reconfiguring quite frequently. Here the motivation of introducing the prohibit timer is to ensure that the UE doesn't send preferred parameters too frequently, which will require the BS scheduler to adapt frequently and be more dynamic.

Although FIG. 11 illustrates one example of a method 1100 for conveying a communication configuration to a BS, various changes may be made to FIG. 11. For example, while shown as a series of steps, various steps in FIG. 11 could overlap, occur in parallel, occur in a different order, or occur any number of times.

Figures 12, 13:
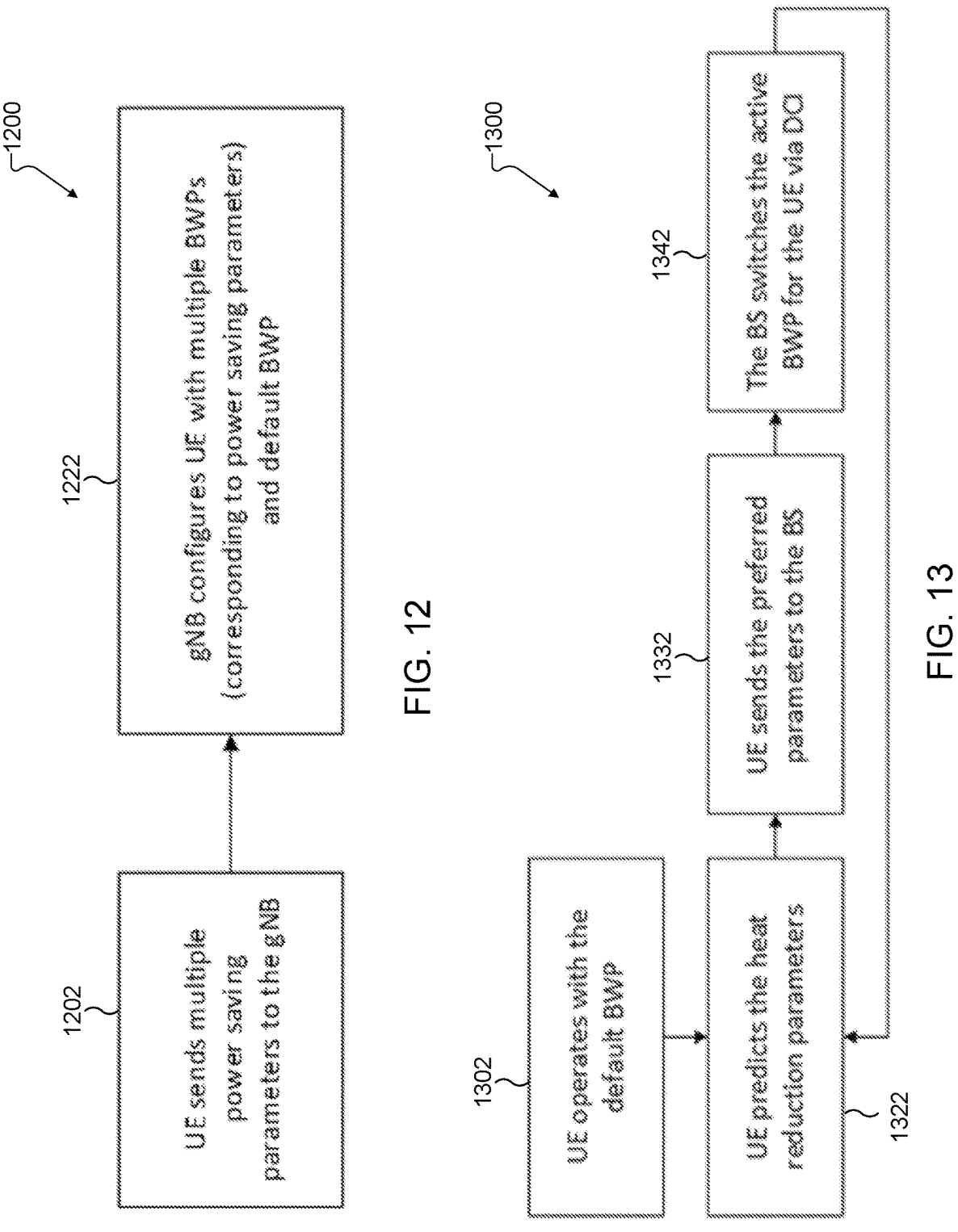
FIGS. 12 and 13 illustrate methods for configuration of a UE with different temperature management parameters according to embodiments of the present disclosure.

Alternative embodiments for configuration of the UE with different temperature management parameters is shown in FIG. 12 and FIG. 13.

FIGS. 12 and 13 illustrate methods 1200 and 1300 for configuration of a UE with different temperature management parameters according to embodiments of the present disclosure. An embodiment of the methods illustrated in FIGS. 12 and 13 is for illustration only. One or more of the components illustrated in FIGS. 12 and 13 may be implemented in specialized circuitry configured to perform the noted functions or one or more of the components may be implemented by one or more processors executing instructions to perform the noted functions. Other embodiments of configuration of a UE with different temperature management parameters could be used without departing from the scope of this disclosure.

The connection establishment phase is the phase in which the UE connects with the NW. This could be when the UE is turned on. During the connection establishment phase the UE shares all the UE capability information with the NW. In the present disclosure, during the connection establishment phase, the UE sends multiple temperature management parameters to the BS as shown in FIG. 12 at block 1202. In one implementation, the sharing of temperature management parameters to the network (NW) can be made part of UE capability information sharing—the 3GPP standard may support this information sharing in the future. For the NW to know the UE capability, the NW sends the UE capability enquiry to which the UE responds with all the requested information. In another implementation, the NW itself configures the UE with multiple bandwidth parts (BWPs), but the UE ranks those BWPs in terms of the overheating risk. At block 1222, the BS configures the UE with multiple BWPs (the MIMO layers are also configured in the BWP framework), one corresponding to one temperature management parameters, and in addition a default BWP. Note that a UE can be configured with up to 4 BWPs in the UL and 4 in the DL. After this the BS indicates the active BWP to the UE via DCI, which is exchanged through PDCCH. Since PDCCH messages are sent to the UE frequently, they do not pose any additional overhead from UE temperature management point of view. After the connection establishment, as the UE starts operation at block 1302 of FIG. 13, it starts with a default BWP. Then at block 1322, the UE predicts the heat reduction parameters (e.g., power saving parameters) and sends the preferred parameters to the BS at block 1332. At block 1342 the BS then switches the active BWP—to the BWP corresponding to the preferred parameters—via DCI (sent in PDCCH). This way of switching BWP poses no additional signaling overhead since active BWP is indicated via BWP indicator inside the DCI, and RRC reconfiguration overhead of the conventional method can be avoided. The limitation of this procedure is that the UE can be configured with a maximum of 4 BWPs, so this procedure can allow UE to operate with up to 3 (excluding the default BWP) temperature saving configurations.

Although FIGS. 12 and 13 illustrate one example of methods 1200 and 1300 for configuration of a UE with different temperature management parameters, various changes may be made to FIGS. 12 and 13. For example, while shown as a series of steps, various steps in FIGS. 12 and 13 could overlap, occur in parallel, occur in a different order, or occur any number of times.

In another embodiment, to leverage the various UE contextual information (which includes the UE status, various sensor's information, and NR configurations status) along with the service type, a binary prediction classifier may be trained, where the two classes are 'high overheating risk' and 'no overheating risk' to occur within a certain prediction horizon. If it is a 'high overheating risk', proposed configurations are sent to the BS as shown in FIG. 14.

Figure 14:
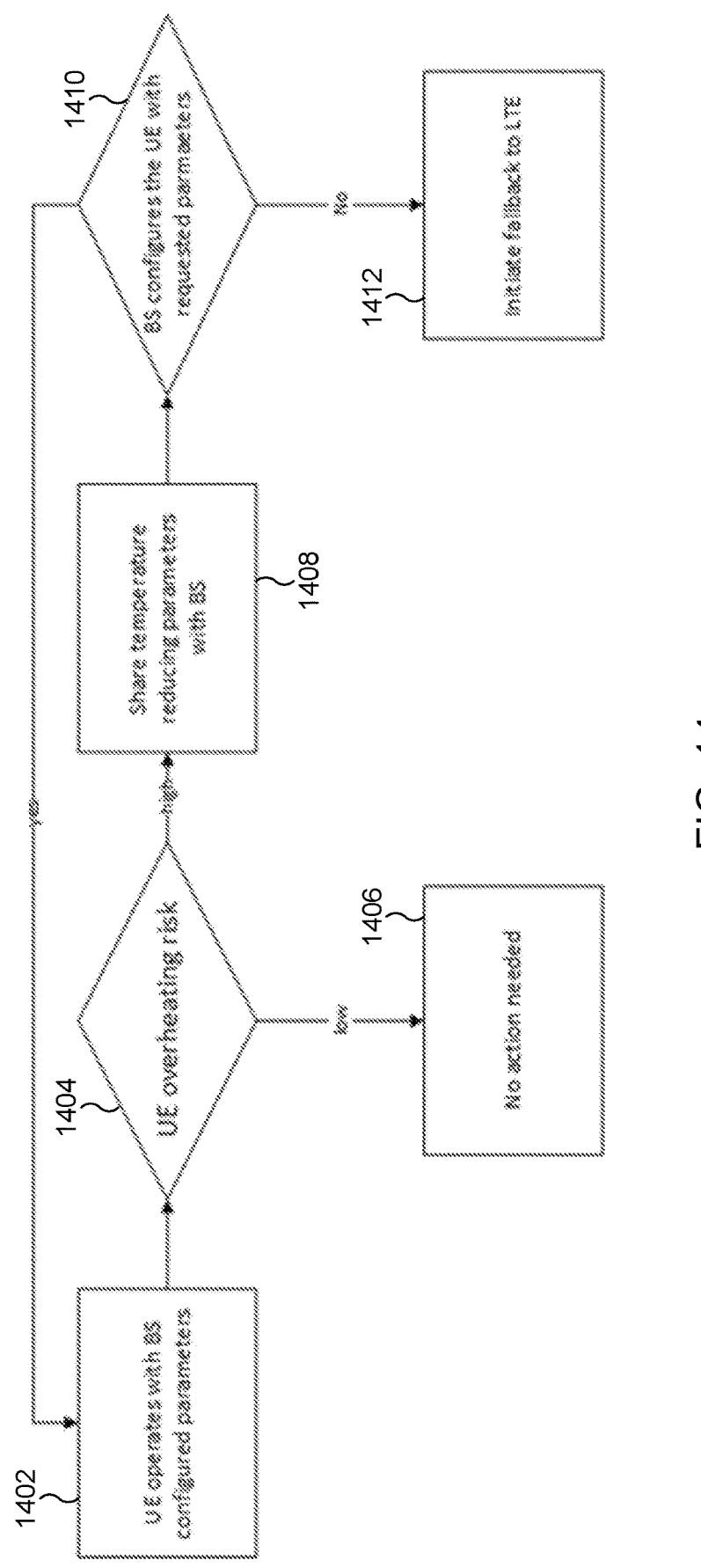
FIG. 14 illustrates a method for conveying a communication configuration to a BS according to embodiments of the present disclosure.

FIG. 14 illustrates a method 1400 for conveying a communication configuration to a BS according to embodiments of the present disclosure. An embodiment of the method illustrated in FIG. 14 is for illustration only. One or more of the components illustrated in FIG. 14 may be implemented in specialized circuitry configured to perform the noted functions or one or more of the components may be implemented by one or more processors executing instructions to perform the noted functions. Other embodiments of conveying a communication configuration to a BS could be used without departing from the scope of this disclosure.

As illustrated in FIG. 14, the method 1400 begins at step 1402. At step 1402, a UE operates with BS configured parameters. At step 1404, the UE determines the UE overheating risk. If there is no overheating risk, no action is needed (step 1406). Otherwise, at step 1408, the UE sends the proposed heat reduction parameters to the BS. At step 1410, if the BS accepts the proposed configuration, the UE operates with the proposed configuration at step 1402. Otherwise, at step 1412, the UE initiates a fallback to the LTE. In another implementation, as soon as 'high overheating risk' is detected, the UE initiates a transition to LTE and allows the NR chip to cool down, before switching back. In another implementation, if the UE is currently operating on FR2 (mmWave), it may fall back to FR1 (sub-6 GHz).

Although FIG. 14 illustrates one example of a method 1400 for conveying a communication configuration to a BS, various changes may be made to FIG. 14. For example, while shown as a series of steps, various steps in FIG. 14 could overlap, occur in parallel, occur in a different order, or occur any number of times.

Multiple embodiments in the present disclosure are based on temperature forecasting and machine learning based overheating risk classification. The computational complexity associated with these methods can be reduced by following a simple gating procedure, e.g., in one embodiment, the temperature prediction and suitable RF parameters determination modules are activated only after some gating condition is satisfied, e.g., the current temperature is greater than a threshold temperature (e.g., 35°), or the temperature change over a time window T (5-10 sec) has been above a threshold th_1 (e.g., 1 degree over 5 seconds).

Figure 15:
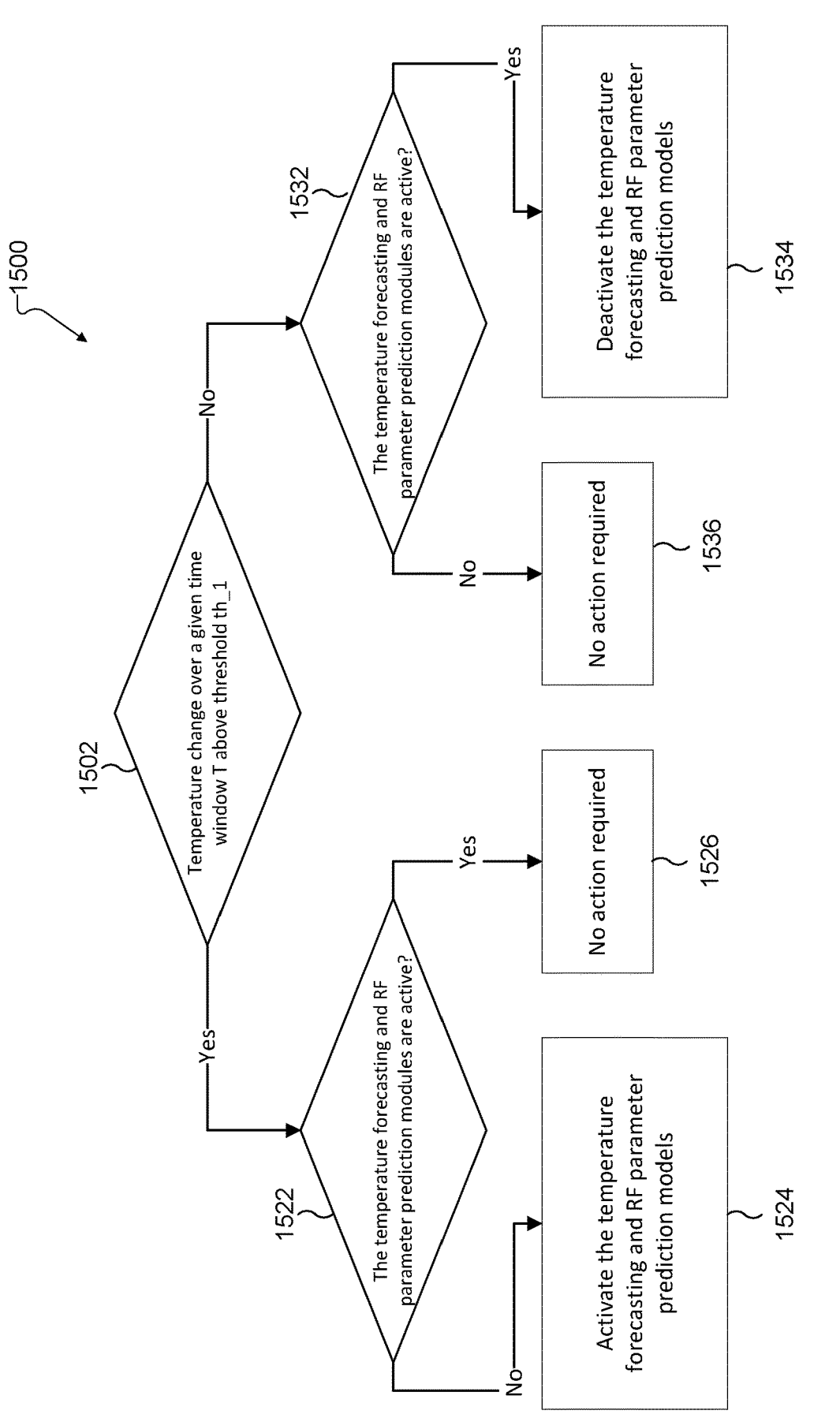
FIG. 15 illustrates a method for gating according to embodiments of the present disclosure.

FIG. 15 illustrates a method 1500 for gating according to embodiments of the present disclosure. An embodiment of the method illustrated in FIG. 15 is for illustration only. One or more of the components illustrated in FIG. 15 may be implemented in specialized circuitry configured to perform the noted functions or one or more of the components may be implemented by one or more processors executing instructions to perform the noted functions. Other embodiments of gating could be used without departing from the scope of this disclosure.

As illustrated in FIG. 15, the method 1500 begins at step 1502. At step 1502, a UE determines whether a temperature change of the UE over a time window T is above a threshold th_1. If the temperature change is above the threshold (step 1522), and the temperatures forecasting and RF parameter prediction modules are not active, the UE activates the temperature forecasting and RF parameter prediction modules (step 1524). Otherwise, no action is required (step 1526). If the temperature change is not above the threshold (step 1532), and the temperatures forecasting and RF parameter prediction modules are active, the UE deactivates the temperature forecasting and RF parameter prediction modules (step 1534). Otherwise, no action is required (step 1536).

Although FIG. 15 illustrates one example of a method 1500 for gating, various changes may be made to FIG. 15. For example, while shown as a series of steps, various steps in FIG. 15 could overlap, occur in parallel, occur in a different order, or occur any number of times.

Multiple embodiments in this disclosure continuously forecast the temperature and/or do machine learning based overheating risk classification. To reduce the associated computational complexity the temperature overheating prediction periodicity can be adapted. As an example, when the temperature is low (e.g., <25° C.), the prediction period can be increased to p_large (e.g., 1 prediction every second) so that fewer predictions are made in a given period (e.g., 5 sec) resulting in reduced complexity. Similarly, if the temperature is high (e.g., ≥40° C.), more frequent temperature predictions are made, i.e., with period p_small (e.g., 1 prediction every 200 ms). In another implementation, the forecasting period is reduced if the temperature change over a time window (5-10 sec) has been above a threshold (e.g., 1 degree over 5 seconds).

Figure 16:
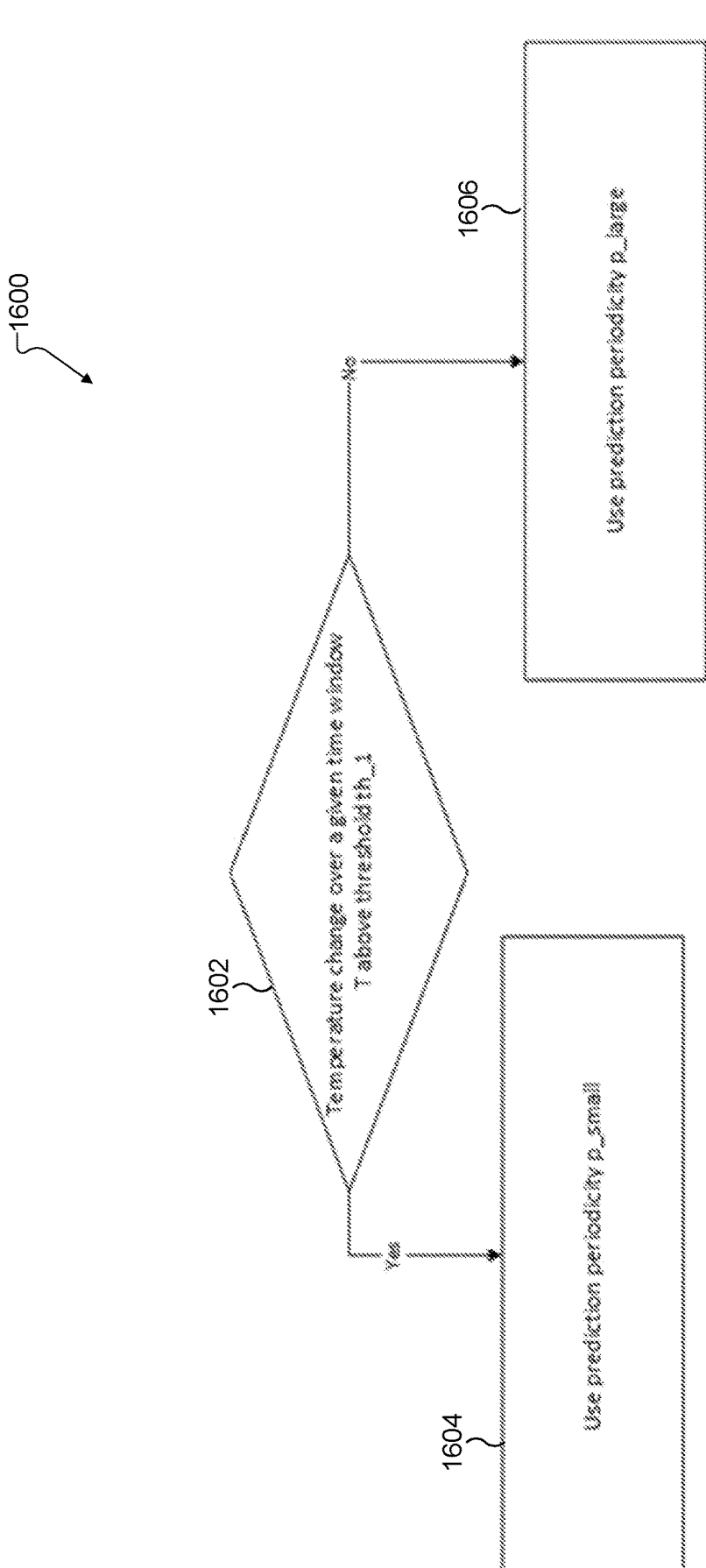
FIG. 16 illustrates a method for adapting prediction periodicity according to embodiments of the present disclosure.

FIG. 16 illustrates a method 1600 for adapting prediction periodicity according to embodiments of the present disclosure. An embodiment of the method illustrated in FIG. 16 is for illustration only. One or more of the components illustrated in FIG. 16 may be implemented in specialized circuitry configured to perform the noted functions or one or more of the components may be implemented by one or more processors executing instructions to perform the noted functions. Other embodiments of adapting prediction periodicity could be used without departing from the scope of this disclosure.

As illustrated in FIG. 16, the method 1600 begins at step 1602. At step 1602, a UE determines whether a temperature change of the UE over a time window T is above a threshold th_1. If the temperature change is above the threshold the UE uses prediction periodicity p_small (step 1604). Otherwise, the UE uses prediction periodicity p_large (step 1606).

Although FIG. 16 illustrates one example of a method 1600 for adapting prediction periodicity, various changes may be made to FIG. 16. For example, while shown as a series of steps, various steps in FIG. 16 could overlap, occur in parallel, occur in a different order, or occur any number of times.

Figure 17:
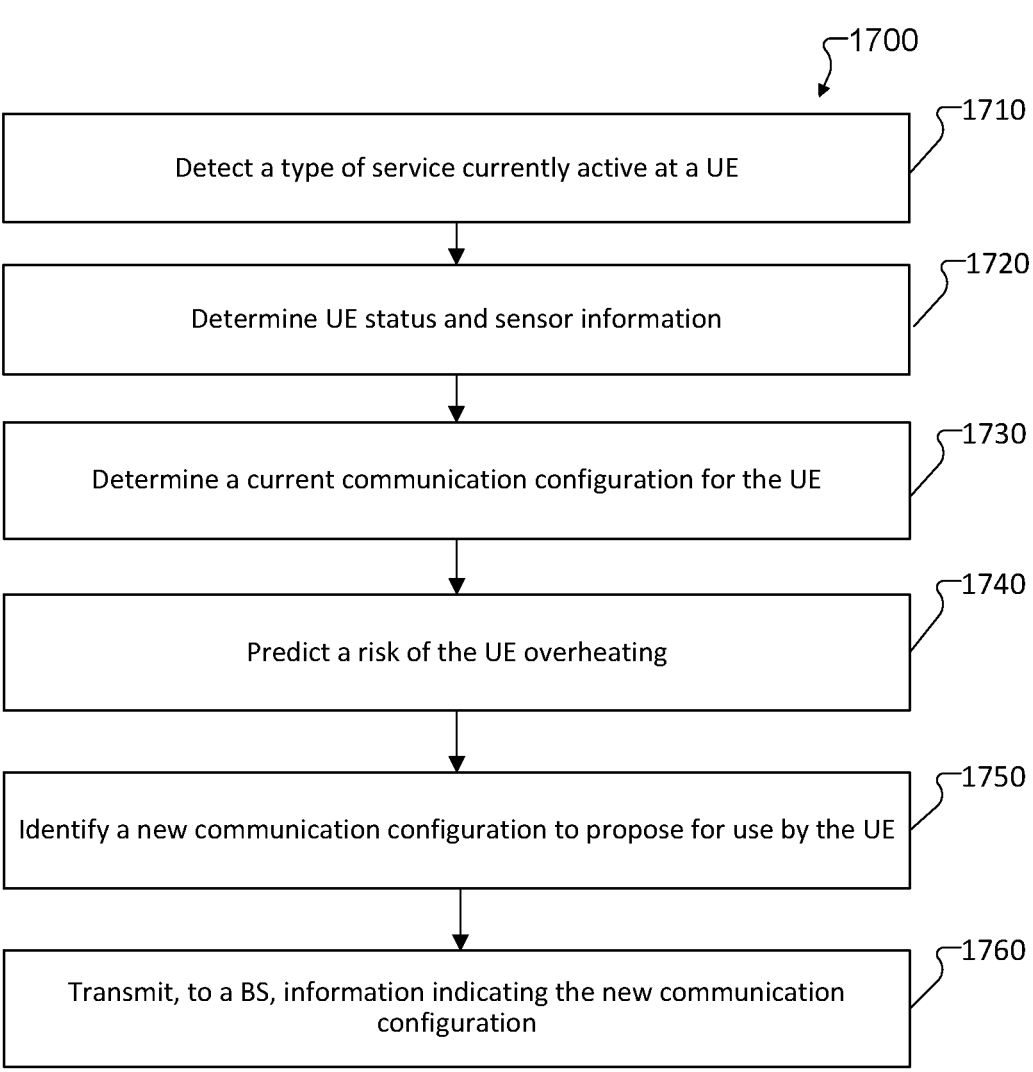
FIG. 17 illustrates a method for traffic aware UE temperature management according to embodiments of the present disclosure.

FIG. 17 illustrates a method 1700 for traffic aware UE temperature management according to embodiments of the present disclosure. An embodiment of the method illustrated in FIG. 17 is for illustration only. One or more of the components illustrated in FIG. 17 may be implemented in specialized circuitry configured to perform the noted functions or one or more of the components may be implemented by one or more processors executing instructions to perform the noted functions. Other embodiments of traffic aware UE temperature management could be used without departing from the scope of this disclosure.

As illustrated in FIG. 17, the method 1700 begins at step 1710. At step 1710, a UE detects a type of service currently active at the UE. The detection of the type of service may be based on a traffic history of the UE. At step 1720, the UE determines UE status and sensor information. At step 1730, the UE determines a current communication configuration of the UE. At step 1740, the UE predicts a risk of the UE overheating. The prediction may be based on the service type, the UE status and sensor information, and the current communication configuration. At step 1750, the UE identifies a new communication configuration to propose for use by the UE. The identification may be based on the predicted risk of the UE overheating. Finally, at step 1760, the UE transmits, to a BS, information indicating the new communication configuration.

Although FIG. 17 illustrates one example of a method 1700 for traffic aware UE temperature management, various changes may be made to FIG. 17. For example, while shown as a series of steps, various steps in FIG. 17 could overlap, occur in parallel, occur in a different order, or occur any number of times.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claim scope. The scope of patented subject matter is defined by the claims.

What is claimed is:

1. A user equipment (UE) comprising:
a processor configured to:
    detect a service type currently active at the UE based on a traffic history of the UE;
    determine UE status and sensor information;
    determine a current communication configuration for the UE;
    based on the service type, the UE status and sensor information, and the current communication configuration, predict a risk of the UE overheating; and
    based on the predicted risk of the UE overheating, identify a new communication configuration to propose for use by the UE; and
a transceiver operably coupled to the processor, the transceiver configured to transmit, to a base station (BS), information indicating the new communication configuration.

2. The UE of claim 1, wherein:
to predict the risk of the UE overheating, the processor is further configured to:
    determine whether the service type is real-time or non-real time; and
    determine whether a current temperature of the UE is greater than a start threshold associated with the determined service type; and
to identify the new communication configuration to propose for use by the UE, the processor is further configured to:
    determine the new communication configuration based on parameters associated with the determined service type if the current temperature of the UE is greater than or equal to a start threshold associated with the determined service type; and
    determine the new communication configuration based on base station configured parameters if the current temperature of the UE is less than the start threshold associated with the determined service type.

3. The UE of claim 1, wherein:
to predict the risk of the UE overheating, the processor is further configured to:
    determine whether the service type is real-time or non-real time;
    predict a future temperature of the UE; and
    determine whether the future temperature of the UE is greater than a start threshold associated with the determined service type; and
wherein to identify the new communication configuration to propose for use by the UE, the processor is further configured to:
    determine the new communication configuration based on parameters associated with the determined service type if the future temperature of the UE is greater than or equal to a start threshold associated with the determined service type; and determine the new communication configuration based on base station configured parameters if the future temperature of the UE is less than the start threshold associated with the determined service type.

4. The UE of claim 3, wherein to predict the future temperature of the UE, the processor is further configured to:

select a time series model based on the determined service type; and predict the future temperature of the UE based on the selected time series model.

5. The UE of claim 1, wherein:

to predict the risk of the UE overheating, the processor is further configured to:

determine whether current traffic of the UE includes substantial new radio (NR) activity;

and if the current traffic of the UE includes substantial NR activity, determine a relationship between a current temperature of the UE and an optimal temperature; and to identify the new communication configuration to propose for use by the UE, the processor is further configured to:

determine a new communication configuration based on parameters associated with an index i+1 if the relationship between the current temperature of the UE is greater than the optimal temperature plus a threshold temperature, wherein i is a current index; and determine a new communication configuration based on parameters associated with an index i−1 if the relationship between the current temperature of the UE is less than the optimal temperature minus the threshold temperature.

6. The UE of claim 1, wherein:

the transceiver is further configured to receive an acknowledgement (ACK) corresponding with the proposed new communication configuration from the BS, if the ACK is received from the BS within a first predetermined period, the UE operates based on the proposed new communication configuration for a second predetermined period; and if the ACK is not received from the BS within the first predetermined period, the UE retransmits the information indicating the new communication configuration to the BS.

7. The UE of claim 1, wherein:

the proposed new communication configuration includes multiple power saving parameters; and the transceiver is further configured to receive a communication configuration from the BS including multiple bandwidth parts corresponding to the power saving parameters.

8. The UE of claim 1, wherein if the UE does not receive a response from the BS related to the proposed new communication configuration, the UE falls back to a long term evolution (LTE) mode of operation.

9. The UE of claim 1, wherein the processor is further configured to:

determine whether a temperature change of the UE over a time window is above a threshold;

determine whether the UE is performing temperature forecasting and RF parameter prediction;

if the temperature change is above the threshold and the UE is not performing temperature forecasting and RF parameter prediction, begin to perform temperature forecasting and RF parameter prediction; and if the temperature change is not above the threshold and the UE is performing temperature forecasting and RF parameter prediction, cease to perform temperature forecasting and RF parameter prediction.

10. The UE of claim 1, wherein the processor is further configured to:

determine whether a temperature change of the UE over a time window is above a threshold;

if the temperature change is above the threshold, decrease a periodicity of predicting the risk of UE overheating; and if the temperature change is not above the threshold, increase the periodicity of predicting the risk of UE overheating.

11. A method of a user equipment (UE), the method comprising:

detecting a service type currently active at the UE based on a traffic history of the UE;

determining UE status and sensor information;

determining a current communication configuration for the UE;

based on the service type, the UE status and sensor information, and the current communication configuration, predicting a risk of the UE overheating;

based on the predicted risk of the UE overheating, identifying a new communication configuration to propose for use by the UE; and transmitting, to a base station (BS), information indicating the new communication configuration.

12. The method of claim 11, wherein:

predicting the risk of the UE overheating comprises:

determining whether the service type is real-time or non-real time; and determining whether a current temperature of the UE is greater than a start threshold associated with the determined service type; and identifying the new communication configuration to propose for use by the UE comprises:

determining the new communication configuration based on parameters associated with the determined service type if the current temperature of the UE is greater than or equal to a start threshold associated with the determined service type; and determining the new communication configuration based on base station configured parameters if the current temperature of the UE is less than the start threshold associated with the determined service type.

13. The method of claim 11, wherein:

predicting the risk of the UE overheating comprises:

determining whether the service type is real-time or non-real time;

predicting a future temperature of the UE; and determining whether the future temperature of the UE is greater than a start threshold associated with the determined service type; and identifying the new communication configuration to propose for use by the UE comprises:

determining the new communication configuration based on parameters associated with the determined service type if the future temperature of the UE is greater than or equal to a start threshold associated with the determined service type; and determining the new communication configuration based on base station configured parameters if the future temperature of the UE is less than the start threshold associated with the determined service type.

14. The method of claim 13, wherein predicting the future temperature of the UE comprises:

selecting a time series model based on the determined service type; and predicting the future temperature of the UE based on the selected time series model.

15. The method of claim 11, wherein:

predicting the risk of the UE overheating comprises:

determining whether current traffic of the UE includes substantial new radio (NR) activity; and if the current traffic of the UE includes substantial NR activity, determining a relationship between a current temperature of the UE and an optimal temperature; and identifying the new communication configuration to propose for use by the UE comprises:

determining a new communication configuration based on parameters associated with an index $i+1$ if the relationship between the current temperature of the UE is greater than the optimal temperature plus a threshold temperature, wherein i is a current index; and determining a new communication configuration based on parameters associated with an index $i-1$ if the relationship between the current temperature of the UE is less than the optimal temperature minus the threshold temperature.

16. The method of claim 11, wherein the method further comprises:

receiving an acknowledgement (ACK) corresponding with the proposed new communication configuration from the BS, if the ACK is received from the BS within a first predetermined period, operating based on the proposed new communication configuration for a second predetermined period; and if the ACK is not received from the BS within the first predetermined period, retransmitting the information indicating the new communication configuration to the BS.

17. The method of claim 11, wherein:

the proposed new communication configuration includes multiple power saving parameters; and the method further comprises receiving a communication configuration from the BS including multiple bandwidth parts corresponding to the power saving parameters.

18. The method of claim 11, wherein if the UE does not receive a response from the BS related to the proposed new communication configuration, the UE falls back to a long term evolution (LTE) mode of operation.

19. The method of claim 11, further comprising:

determining whether a temperature change of the UE over a time window is above a threshold;

determining whether the UE is performing temperature forecasting and RF parameter prediction;

if the temperature change is above the threshold and the UE is not performing temperature forecasting and RF parameter prediction, beginning to perform temperature forecasting and RF parameter prediction; and if the temperature change is not above the threshold and the UE is performing temperature forecasting and RF parameter prediction, ceasing to perform temperature forecasting and RF parameter prediction.

20. The method of claim 11, further comprising:

determining whether a temperature change of the UE over a time window is above a threshold;

if the temperature change is above the threshold, decreasing a periodicity of predicting the risk of UE overheating; and if the temperature change is not above the threshold, increasing the periodicity of predicting the risk of UE overheating.

* * * * *